United States Patent [19]
Tsukishima

[11] Patent Number: 5,707,588
[45] Date of Patent: Jan. 13, 1998

[54] DROPLET FLOATING APPARATUS

[75] Inventor: Chihiro Tsukishima, Hyogo, Japan

[73] Assignee: Mitsubishi Denki Kabushiki Kaisha, Tokyo, Japan

[21] Appl. No.: 448,179

[22] Filed: May 23, 1995

Related U.S. Application Data

[62] Division of Ser. No. 340,272, Nov. 15, 1994, Pat. No. 5,558,837.

[30] Foreign Application Priority Data

Apr. 5, 1994 [JP] Japan .................... 6-067010

[51] Int. Cl.⁶ .................................................. B01L 3/00
[52] U.S. Cl. .......................... 422/99; 422/100; 73/863.31; 73/864.91; 222/195; 222/330; 222/420
[58] Field of Search ................ 436/174; 422/99, 422/100; 73/863.31, 864.91, 863.21; 222/330, 335, 420, 195, 333

[56] References Cited

U.S. PATENT DOCUMENTS

| | | | |
|---|---|---|---|
| 4,085,408 | 4/1978 | Muto et al. | 346/75 |
| 4,190,846 | 2/1980 | Yamamoto et al. | 346/140 R |
| 4,628,040 | 12/1986 | Green et al. | 502/9 |
| 5,012,593 | 5/1991 | Okada et al. | 34/69 |

FOREIGN PATENT DOCUMENTS

| | | |
|---|---|---|
| 445892 | 11/1991 | European Pat. Off. . |
| 2418093B2 | 10/1975 | Germany . |
| 3012946A1 | 10/1980 | Germany . |
| 4-5711 | 1/1992 | Japan . |

OTHER PUBLICATIONS

W.K. Rhim et al., "Electrostatic Levitators and Drop Dynamics Experiments" Jan. 1990 Jet Propolsion Lab, Jan. 1990.

*Primary Examiner*—Harold Y. Pyon
*Attorney, Agent, or Firm*—Wolf, Greenfield & Sacks, P.C.

[57] ABSTRACT

A droplet floating apparatus is provided to float a sample without any contact so as to carry out various types of experiments and develop new materials. The droplet floating apparatus includes a liquid sample supply pipe whose distal end is opened to a floating space, to receive supply of a liquid sample to form a droplet at the distal end, a separating device for separating the droplet from the liquid sample supply pipe, and a device for confining the separated droplet in the floating space without ambient contact. The separating device uses a gas to spray a pressurized gas on the droplet, and the confining device uses voltage. The liquid sample supply pipe is periodically vibrated, and the distal end of the liquid sample supply pipe may be diagonally cut away or may be heated. A plurality of liquid sample supply pipes may be mounted to supply a plurality of types of liquid samples. Further, the droplet may be recovered by suction of a droplet recovery pipe, an adsorber, or the like.

2 Claims, 22 Drawing Sheets

DROPLET FLOATING APPARATUS

This application is a division of application Ser. No. 08/340,272 filed Nov. 15, 1994, now U.S. Pat. No. 5,558,837.

BACKGROUND OF THE INVENTION

1. Field of the Invention

This invention relates to an apparatus to float a sample without any contact so as to carry out various types of experiments and develop new materials, and more particularly to supply of the liquid sample, and recovery of a droplet.

2. Description of the Prior Art

FIG. 22 is a sectional view of a conventional droplet floating apparatus disclosed in, for example, W. K. Rhim et al. "Electrostatic Levitators and Drop Dynamics Experiment" in Proceedings of the 7th European Symposium on Materials and Fluid Sciences in Microgravity, (1990). In the drawing, reference numerals 2a, 2b are electrodes, 5 is a nozzle, 6 is a tube to supply liquid, and 7 is a mechanism to apply an impact force to the nozzle. FIG. 23 is an enlarged view showing the nozzle and the mechanism to apply the impact force to the nozzle in FIG. 22. In the drawing, reference numeral 1 means a droplet, 1a is air, 2c is an electrode, 7a is a solenoid electromagnet core, 7b is a solenoid magnet coil, and 22 is a velvet pad attached to a distal end of the nozzle.

In such a droplet floating apparatus, the liquid supplied by the tube 6 becomes the droplet 1 at the distal end of the nozzle 5. At this time, the droplet 1 is charged by voltage applied across the electrodes 2a and 2b. The droplet 1 positioned at the distal end of the nozzle 5 is separated from the nozzle 5 by the solenoid electromagnets 7a, 7b vertically hitting a lower portion of the nozzle 5, and is thereafter floated by an electrostatic force caused by an electric field across the electrodes 2a and 2b and charge of the droplet 1.

In addition to the above application of the electric field by using the electrodes 2a and 2b, means for confining the droplet 1 in a floating space without ambient contact may include other means using a sound wave or electromagnetic repulsion disclosed in, for example, Toshio Azuma, "Observation of Vibration of Droplet by Sound Wave Floating" Parabolic Flight, (1991).

In the droplet floating apparatus as set forth above, the droplet 1 is separated from the nozzle 5 by reaction of the impact force applied to the nozzle 5. Hence, there is a problem in that a large impact force prohibits stable supply of the droplet 1 because the droplet 1 may be splashed in response to the large impact force.

Means for recovery of the droplet 1 is not disclosed in the above cited references, and it is necessary to provide any means for the recovery.

SUMMARY OF THE INVENTION

In view of the foregoing, in order to overcome the above problems, it is an object of the present invention to provide a droplet floating apparatus which can stably supply a droplet into a floating space. It is another object of the present invention to provide a droplet floating apparatus which can recover the droplet.

According to the first aspect of the present invention, for achieving the above-mentioned objects, there is provided a droplet floating apparatus including a liquid sample supply pipe whose distal end is opened to a floating space, to receive supply of a liquid sample to form a droplet at the distal end, separating means for separating the droplet from the liquid sample supply pipe, and means for confining the separated droplet in the floating space without ambient contact. In the droplet floating apparatus, the separating means uses a gas.

According to the second aspect of the present invention, there is provided a droplet floating apparatus according to the first aspect, in which the separating means using the gas is means for spraying a pressurized gas on the droplet.

According to the third aspect of the present invention, there is provided a droplet floating apparatus according to the second aspect, including a multi-tube whose distal end is opened to a floating space. In the droplet floating apparatus, a liquid sample is supplied through at least one tube, and a gas is supplied through at least one remaining tube.

According to the fourth aspect of the present invention, there is provided a droplet floating apparatus according to the third aspect, in which a distal end of the multi-tube has a step between an inner tube and an outer tube.

According to the fifth aspect of the present invention, there is provided a droplet floating apparatus according to the third or the fourth aspect, including means for removing liquid entering a gas supply pipe.

According to the sixth aspect of the present invention, there is provided a droplet floating apparatus according to the fifth aspect, in which the liquid entering the gas supply pipe is removed by ejection or suction of the gas.

According to the seventh aspect of the present invention, there is provided a droplet floating apparatus according to the second aspect, in which the means for spraying the pressurized gas on the droplet is a pipe formed separately from the liquid sample supply pipe to have a gas port in the vicinity of the distal end of the liquid sample supply pipe.

According to the eighth aspect of the present invention, there is provided a droplet floating apparatus according to the second aspect, in which the pressurized gas supply means is any one of a cylinder and a high pressure bomb.

According to the ninth aspect of the present invention, there is provided a droplet floating apparatus according to the first aspect, in which a liquid sample and a gas are alternately fed into a liquid sample supply pipe.

According to the tenth aspect of the present invention, there is provided a droplet floating apparatus including a liquid sample supply pipe whose distal end is opened to a floating space, to receive supply of a liquid sample to form a droplet at the distal end, separating means for separating the droplet from the liquid sample supply pipe, and means for confining the separated droplet in the floating space without ambient contact. In the droplet floating apparatus, the droplet is separated from the liquid sample supply pipe by applying voltage between the liquid sample supply pipe and an electrode opposed thereto.

According to the eleventh aspect of the present invention, there is provided a droplet floating apparatus according to the tenth aspect, in which the means for confining the droplet has at least a pair of opposite electrodes, and the droplet is separated from the liquid sample supply pipe by applying pulse voltage between the one electrode and the liquid sample supply pipe.

According to the twelfth aspect of the present invention, there is provided a droplet floating apparatus including a liquid sample supply pipe whose distal end is opened to a floating space, to receive supply of a liquid sample to form a droplet at the distal end, separating means for separating the droplet from the liquid sample supply pipe, and means for confining the separated droplet in the floating space without ambient contact. In the droplet floating apparatus, the droplet is separated from the liquid sample supply pipe by periodically vibrating the liquid sample supply pipe.

According to the thirteenth aspect of the present invention, there is provided a droplet floating apparatus according to the twelfth aspect, in which the liquid sample supply pipe is periodically vibrated by rotating a weight eccentrically and rotatably attached to the liquid sample supply pipe through a shaft.

According to the fourteenth aspect of the present invention, there is provided a droplet floating apparatus according to the twelfth aspect, in which the liquid sample supply pipe is periodically vibrated by rotating a rotator having a projection, and contacting the projection with the liquid sample supply pipe.

According to the fifteenth aspect of the present invention, there is provided a droplet floating apparatus according to the twelfth aspect, in which the liquid sample supply pipe is disposed in contact with an ultrasonic vibrator, and the liquid sample supply pipe is periodically vibrated by the ultrasonic vibrator.

According to the sixteenth aspect of the present invention, there is provided a droplet floating apparatus according to the twelfth aspect, in which a magnetic material is rigidly secured to the liquid sample supply pipe, and the magnetic material is vibrated by causing an ac current flow or a pulse current flow in a coil so as to periodically vibrate the liquid sample supply pipe.

According to the seventeenth aspect of the present invention, there is provided a droplet floating apparatus including a liquid sample supply pipe whose distal end is opened to a floating space, to receive supply of a liquid sample to form a droplet at the distal end, separating means for separating the droplet from the liquid sample supply pipe, and means for confining the separated droplet in the floating space without ambient contact. In the droplet floating apparatus, the distal end of the liquid sample supply pipe is cut away diagonally with respect to an axis of the liquid sample supply pipe.

According to the eighteenth aspect of the present invention, there is provided a droplet floating apparatus including a liquid sample supply pipe whose distal end is opened to a floating space, to receive supply of a liquid sample to form a droplet at the distal end, separating means for separating the droplet from the liquid sample supply pipe, and means for confining the separated droplet in the floating space without ambient contact. In the droplet floating apparatus, the droplet is separated from the liquid sample supply pipe by heating the distal end of the liquid sample supply pipe.

According to the nineteenth aspect of the present invention, there is provided a droplet floating apparatus according to the eighteenth aspect, in which a heating wire or an infrared ray is used to heat the distal end of the liquid sample supply pipe.

According to the twentieth aspect of the present invention, there is provided a droplet floating apparatus including a liquid sample supply pipe whose distal end is opened to a floating space, to receive supply of a liquid sample to form a droplet at the distal end, separating means for separating the droplet from the liquid sample supply pipe, and means for confining the separated droplet in the floating space without ambient contact. In the droplet floating apparatus, a plurality of liquid sample supply pipes are mounted.

According to the twenty-first aspect of the present invention, there is provided a droplet floating apparatus according to the twentieth aspect, in which distal ends of the plurality of liquid sample supply pipes are disposed in close proximity to each other, and liquid samples fed into the respective liquid sample supply pipes are mixed at the distal ends to be separated from the liquid sample supply pipes.

According to the twenty-second aspect of the present invention, there is provided a droplet floating apparatus according to the twentieth aspect, in which the respective distal ends of the plurality of liquid sample supply pipes are disposed apart from each other at predetermined intervals, and droplets are formed at the respective distal ends by supplying the liquid samples to the respective liquid sample supply pipes and are separated from the respective liquid sample supply pipes.

According to the twenty-third aspect of the present invention, there is provided a droplet floating apparatus including means for recovering a droplet confined in a floating space without ambient contact.

According to the twenty-fourth aspect of the present invention, there is provided a droplet floating apparatus according to the twenty-third aspect, in which the droplet is sucked for recovery by a droplet recovery pipe.

According to the twenty-fifth aspect of the present invention, there is provided a droplet floating apparatus according to the twenty-fourth aspect, including a liquid sample supply pipe whose distal end is opened to a floating space, to receive supply of a liquid sample to form a droplet at the distal end. In the droplet floating apparatus, the liquid sample supply pipe also serves as a droplet recovery pipe.

According to the twenty-sixth aspect of the present invention, there is provided a droplet floating apparatus according to the twenty-third aspect, in which an adsorber is inserted into the floating space to adsorb the droplet for recovery.

According to the twenty-seventh aspect of the present invention, there is provided a droplet floating apparatus according to the twenty-sixth aspect, in which the adsorber is a needle-like or sheet-like adsorber.

As stated above, according to the first aspect of the present invention, the droplet floating apparatus includes the liquid sample supply pipe whose distal end is opened to the floating space, to receive supply of the liquid sample to form the droplet at the distal end, the separating means for separating the droplet from the liquid sample supply pipe, and the means for confining the separated droplet in the floating space without ambient contact. In the droplet floating apparatus, since the separating means uses a gas, it is possible to easily separate the droplet, and stably supply the droplet into the floating space.

According to the second aspect of the present invention, the separating means using the gas according to the first aspect is the means for spraying the pressurized gas on the droplet. Thus, spray pressure of the gas exceeds the adsorptivity between the liquid sample supply pipe and the droplet, thereby separating the droplet formed at the distal end of the liquid sample supply pipe from the liquid sample supply pipe. As a result, it is possible to stably supply the droplet into the floating space.

According to the third aspect of the present invention, the droplet floating apparatus according to the second aspect includes the multi-tube whose distal end is opened to the floating space. Further, the liquid sample is supplied through at least the one tube, and the gas is supplied through at least the one remaining tube. As a result, it is possible to efficiently separate the droplet in a compact and simple structure.

According to the fourth aspect of the present invention, the distal end of the multi-tube according to the third aspect has the step between the inner tube and the outer tube. As a result, it is possible to avoid entrance of the liquid into the gas supply pipe.

According to the fifth aspect of the present invention, the droplet floating apparatus according to the third or the fourth aspect includes the means for removing the liquid entering the gas supply pipe. As a result, it is possible to remove the liquid entering the gas supply pipe and stably separate the droplet.

According to the sixth aspect of the present invention, in the droplet floating apparatus according to the fifth aspect, the liquid entering the gas supply pipe is removed by the ejection or the suction of the gas. As a result, it is possible to easily remove the liquid.

According to the seventh aspect of the present invention, the means for spraying the pressurized gas on the droplet according to the second aspect is the pipe formed separately from the liquid sample supply pipe to have the gas port in the vicinity of the distal end of the liquid sample supply pipe. As a result, the liquid never enters the gas supply pipe. Further, the gas can be ejected to the droplet from all directions as well as from a lower direction. As a result, it is possible to more stably and easily separate the droplet.

According to the eighth aspect of the present invention, the pressurized gas supply means according to the second aspect is any one of the cylinder and the high pressure bomb. As a result, it is possible to easily supply a high pressure gas.

According to the ninth aspect of the present invention, in the droplet floating apparatus according to the first aspect, the liquid sample and the gas are alternately fed into the liquid sample supply pipe. As a result, it is possible to separate the droplet from the pipe in a simple structure, for example, in a structure without a cylinder.

According to the tenth aspect of the present invention, the droplet is separated from the liquid sample supply pipe by applying the voltage between the liquid sample supply pipe and the electrode opposed thereto. The droplet is charged by the voltage applied between the liquid sample supply pipe and the electrode opposed to the liquid sample supply pipe. Subsequently, force attracted by the charged droplet in a direction of the opposite electrode exceeds adsorptivity between the liquid sample supply pipe and the droplet. As a result, it is possible to separate the droplet from the liquid sample supply pipe in a simple structure, for example, in a structure without a cylinder. Further, it is possible to stably supply the droplet by adjusting the voltage.

According to the eleventh aspect of the present invention, in the droplet floating apparatus according to the tenth aspect, the means for confining the droplet has at least the pair of opposite electrodes, and the droplet is separated from the liquid sample supply pipe by applying the pulse voltage between the one electrode and the liquid sample supply pipe. Therefore, an additional electrode for separation is not required, resulting in a simplified structure.

According to the twelfth aspect of the present invention, the droplet is separated from the liquid sample supply pipe by periodically vibrating the liquid sample supply pipe. When the liquid sample supply pipe is periodically vibrated, inertial force of the droplet causes force to separate the droplet from the liquid sample supply pipe. Further, the force exceeds adsorptivity between the liquid sample supply pipe and the droplet, thereby separating the droplet from the liquid sample supply pipe. As a result, it is possible to easily separate the droplet, and stably supply the droplet into the floating space.

According to the thirteenth aspect of the present invention, in the droplet floating apparatus according to the twelfth aspect, the liquid sample supply pipe is periodically vibrated by rotating the weight eccentrically and rotatably attached to the liquid sample supply pipe through the shaft. As a result, it is possible to provide the optimal period and the optimal amplitude by selecting a type of the weight and the number of revolutions thereof.

According to the fourteenth aspect of the present invention, in the droplet floating apparatus according to the twelfth aspect, the liquid sample supply pipe is periodically vibrated by rotating the rotator having the projection, and contacting the projection with the liquid sample supply pipe. As a result, it is possible to provide the optimal period and the optimal amplitude by selecting a type of the rotator and the number of revolutions thereof.

According to the fifteenth aspect of the present invention, in the droplet floating apparatus according to the twelfth aspect, the liquid sample supply pipe is disposed in contact with the ultrasonic vibrator, and the liquid sample supply pipe is periodically vibrated by the ultrasonic vibrator. As a result, it is possible to provide the optimal period and the optimal amplitude.

According to the sixteenth aspect of the present invention, in the droplet floating apparatus according to the twelfth aspect, the magnetic material is rigidly secured to the liquid sample supply pipe, and the magnetic material is vibrated by causing the ac current flow or the pulse current flow in the coil so as to periodically vibrate the liquid sample supply pipe. As a result, it is possible to provide the optimal period and the optimal amplitude.

According to the seventeenth aspect of the present invention, the distal end of the liquid sample supply pipe is cut away diagonally with respect to the axis of the liquid sample supply pipe. As a result, it is possible to reduce the adsorptivity between the droplet and the liquid sample supply pipe so as to easily separate the droplet.

According to the eighteenth aspect of the present invention, the droplet is separated from the liquid sample supply pipe by heating the distal end of the liquid sample supply pipe. When the liquid sample supply pipe is heated, a temperature of the droplet at a portion contacting the liquid sample supply pipe is increased to reduce adsorptivity between the droplet and the liquid sample supply pipe, thereby separating the droplet from the liquid sample supply pipe. As a result, it is possible to easily separate the droplet, and stably supply the droplet into the floating space.

According to the nineteenth aspect of the present invention, the heating wire or the infrared ray is used to heat the distal end of the liquid sample supply pipe according to the eighteenth aspect. As a result, it is possible to easily control the amount of heating.

According to the twentieth aspect of the present invention, the droplet floating apparatus includes the plurality of liquid sample supply pipes. As a result, it is possible to simultaneously supply a plurality of types of liquid samples.

According to the twenty-first aspect of the present invention, in the droplet floating apparatus according to the twentieth aspect, the respective distal ends of the plurality of liquid sample supply pipes are disposed in close proximity to each other, and the liquid samples fed into the respective liquid sample supply pipes are mixed at the distal ends to be separated from the liquid sample supply pipes. As a result, it is possible to mix a plurality of types of liquid samples before the separation from the liquid sample supply pipes.

According to the twenty-second aspect of the present invention, in the droplet floating apparatus according to the twentieth aspect, the respective distal ends of the plurality of liquid sample supply pipes are disposed apart from each other at predetermined intervals, and droplets are formed at the respective distal ends by supplying the liquid samples to the respective liquid sample supply pipes and are separated from the respective liquid sample supply pipes. As a result, it is possible to mix a plurality of types of liquid samples after the separation from the liquid sample supply pipe.

According to the twenty-third aspect of the present invention, the droplet floating apparatus includes the means for recovering the droplet confined in the floating space without ambient contact. As a result, it is possible to recover the droplet.

According to the twenty-fourth aspect of the present invention, in the droplet floating apparatus according to the twenty-third aspect, the droplet is sucked for recovery by the droplet recovery pipe. As a result, it is possible to easily recover the droplet.

According to the twenty-fifth aspect of the present invention, the droplet floating apparatus according to the twenty-fourth aspect includes the liquid sample supply pipe whose distal end is opened to the floating space, to receive supply of the liquid sample to form the droplet at the distal end. Further, the liquid sample supply pipe also serves as the droplet recovery pipe. As a result, it is possible to simplify a structure.

According to the twenty-sixth aspect of the present invention, in the droplet floating apparatus according to the twenty-third aspect, the adsorber is inserted into the floating space to adsorb the droplet for recovery. As a result, it is possible to easily recover the droplet.

According to the twenty-seventh aspect of the present invention, the adsorber according to the twenty-sixth aspect is a needle-like or sheet-like adsorber. As a result, it is possible to easily recover the droplet.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Embodiment 1

Figure 1:
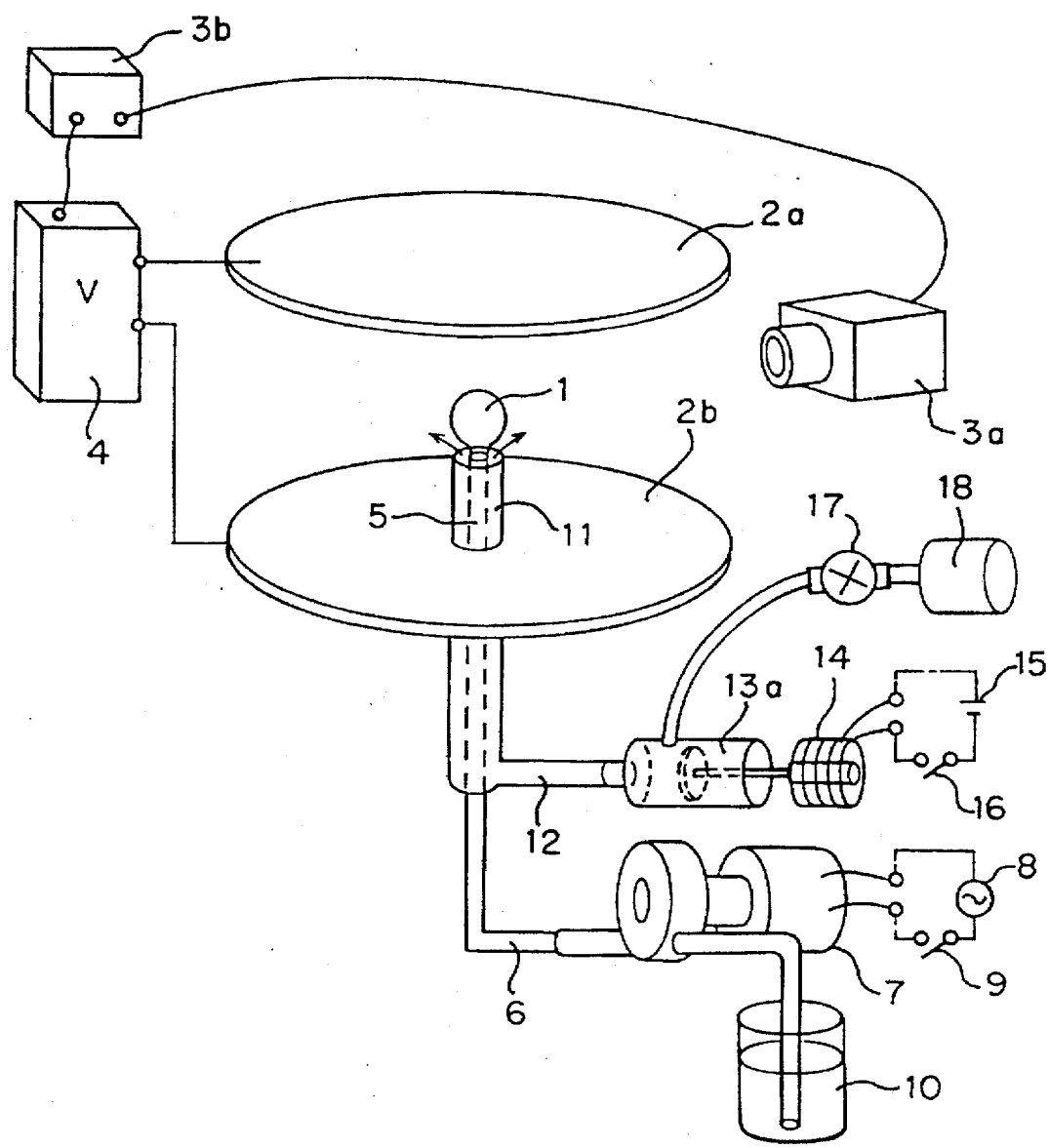
FIG. 1 is a perspective view showing a structure of a droplet floating apparatus according to the embodiment 1.

Referring now to FIG. 1, a description will be given of one embodiment in the first to the third, the fifth, the sixth, and the eighth aspects of the present invention. In the drawing, reference numeral 1 is a droplet, 2a and 2b are electrodes, 3a is an apparatus such as CCD camera to measure a position of the droplet, 3b is an arithmetic unit to calculate voltage across the electrodes according to the position and movement of the droplet, and 4 is a power source to output voltage according to the result of operation of the arithmetic unit 3. Reference numeral 5 is a liquid sample supply pipe to supply the droplet into a floating space, that is, a liquid nozzle, 6 is a tube to feed the droplet, 7 is a pump to feed the droplet, 8 is a power source of the pump 7, 9 is a switch to turn ON and OFF the pump 7, and 10 is a container to store liquid composed of the droplet, that is, the liquid sample. Reference numeral 11 means a gas supply pipe to supply a gas, that is, a gas nozzle, and the liquid nozzle 5 and the gas nozzle 11 are formed by a double tube. Reference numeral 12 means a tube to feed the gas, 13a is a cylinder to compress the gas, 14 is an electromagnet to drive the cylinder 13a, 15 is a power source for the electromagnet 14, 16 is a switch to actuate or deactivate the electromagnet 15, 17 is a valve for a gas sucked into the cylinder 13a, and 18 is a bomb to store the gas.

A description will now be given of the operation.

In a droplet floating apparatus having such a structure, the switch 9 is turned ON to drive the pump 7 so as to feed the liquid sample from the container 10 to a distal end of the liquid nozzle 5 through the tube 6, resulting in the droplet 1 formed at the distal end of the nozzle 5. After an appropriate volume of droplet 1 is formed, the switch 9 is turned OFF to stop supplying the liquid sample. At this time, appropriate voltage is applied across the electrodes 2a and 2b to provide charge for a surface of the droplet 1. The charge is attracted by the opposite electrode 2a so that adsorptivity between a lower portion of the droplet 1 and the liquid nozzle 5 is balanced with an electric force at an upper portion of the droplet 1, and the droplet 1 can be held at the distal end of the liquid nozzle 5 without falling. Subsequently, the valve 17 is opened to introduce the gas into the cylinder 13a. The switch 16 is turned ON to actuate the electromagnet 14 so as to compress the gas in the cylinder 13a. The gas compressed by appropriate pressure passes through the tube 12 to be ejected from the gas nozzle 11. The liquid nozzle 5 and the gas nozzle 11 are disposed coaxially. In this case, the ejected gas hits the lower portion of the droplet 1 to separate the droplet 1 from the liquid nozzle 5. The droplet 1 is separated from the liquid nozzle 5 as set forth above, and the charged droplet is floated between the electrodes 2a and 2b. Further, a position of the droplet is controlled by a feedback control mechanism including the electrodes 2a and 2b, the position measuring apparatus 3a, the arithmetic unit 3b, and the power source 4. Thus, the droplet is held in the floating space between the electrodes 2a and 2b without ambient contact.

In such a way, it is possible to easily separate the droplet 1 from the liquid nozzle 5, and stably and repeatedly supply a constant volume of the droplet 1 into the floating space so as to hold the droplet 1 therein.

Since the liquid nozzle 5 and the gas nozzle 11 have a double tube structure, the droplet floating apparatus is compact and has a simple structure. However, the droplet may enter a gap between the liquid nozzle 5 and the gas nozzle 11, and may prohibit ejection of the gas at a time of second or later supply of the droplet. In order to avoid entrance of the droplet, a compressed gas supply mechanism including the cylinder 13a, the electromagnet 14, the power source 15, the switch 16, the valve 17, and the bomb 18 is previously actuated before supplying the droplet to eject or suck the gas into the gas nozzle 11. It is thereby possible to eliminate entrance of the unnecessary droplet.

Embodiment 2

Figure 2:
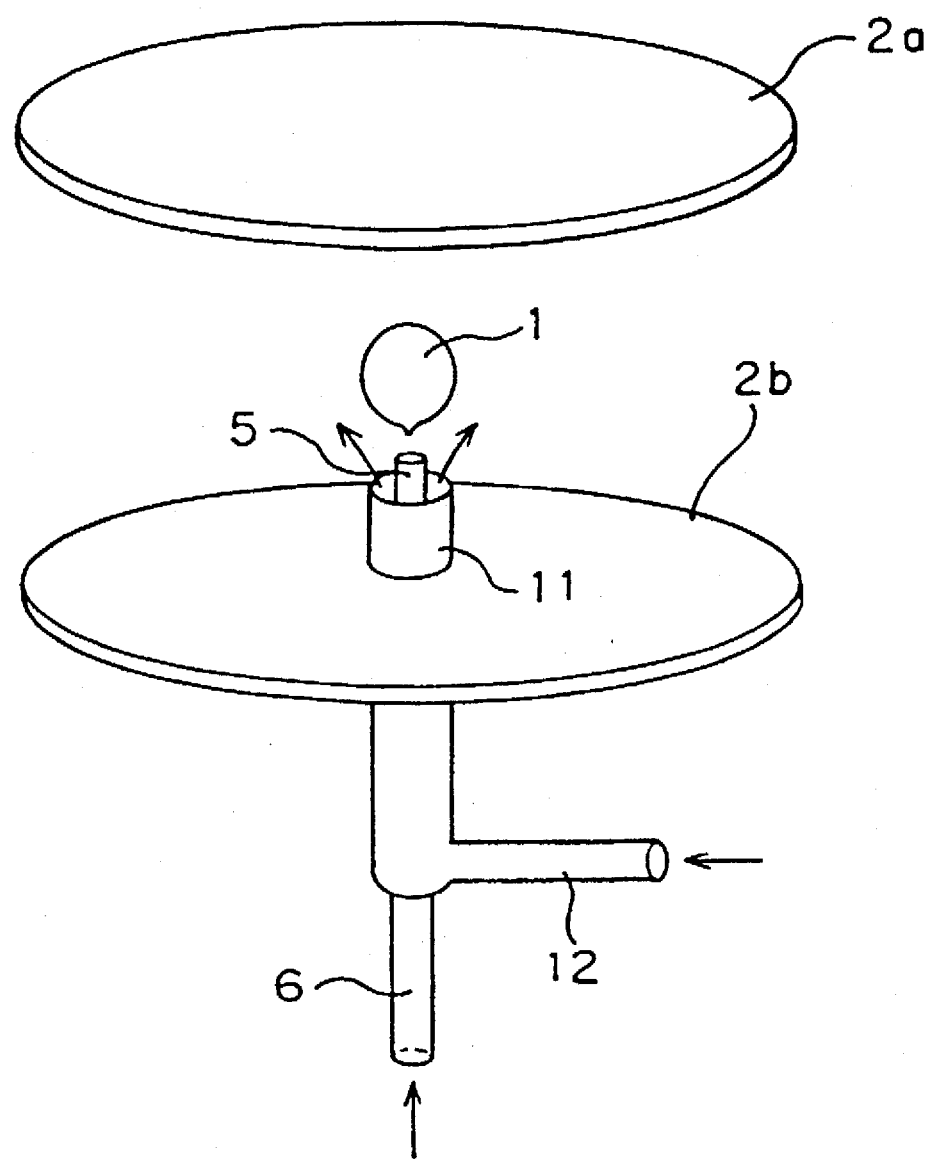
FIG. 2 is a perspective view showing an essential structure of a droplet floating apparatus according to the embodiment 2.

FIG. 2 is a perspective view showing an essential part of a droplet floating apparatus according to one embodiment in the first to the fourth aspects of the present invention, and a structure other than the essential part is identical with that in FIG. 1. In the embodiment, a liquid nozzle 5 and a gas nozzle 11 have a double tube structure, and a distal end of the double tube has a step between an inner tube 5 and an outer tube 11. That is, a distal end of the inner liquid nozzle 5 extends farther than that of the outer gas nozzle 11. Thus, a droplet 1 can not easily contact the gas nozzle 1 in this construction so that the droplet 1 can be prevented from entering the gas nozzle 11.

In the embodiment, a description has been given of a case where the double tube is employed as a multi-tube, a liquid sample is supplied from the inner tube 5 and a gas is supplied from the outer tube 11, and the distal end of the inner tube 5 for supplying the liquid sample is extended farther than the of the outer tube. However, it must be noted that, for example, the multi-tube may be a triple tube, and the present invention should not be limited to the above specific embodiment about which tube is used to supply the liquid sample, which tube is extended, and so forth.

Embodiment 3

Figure 3:
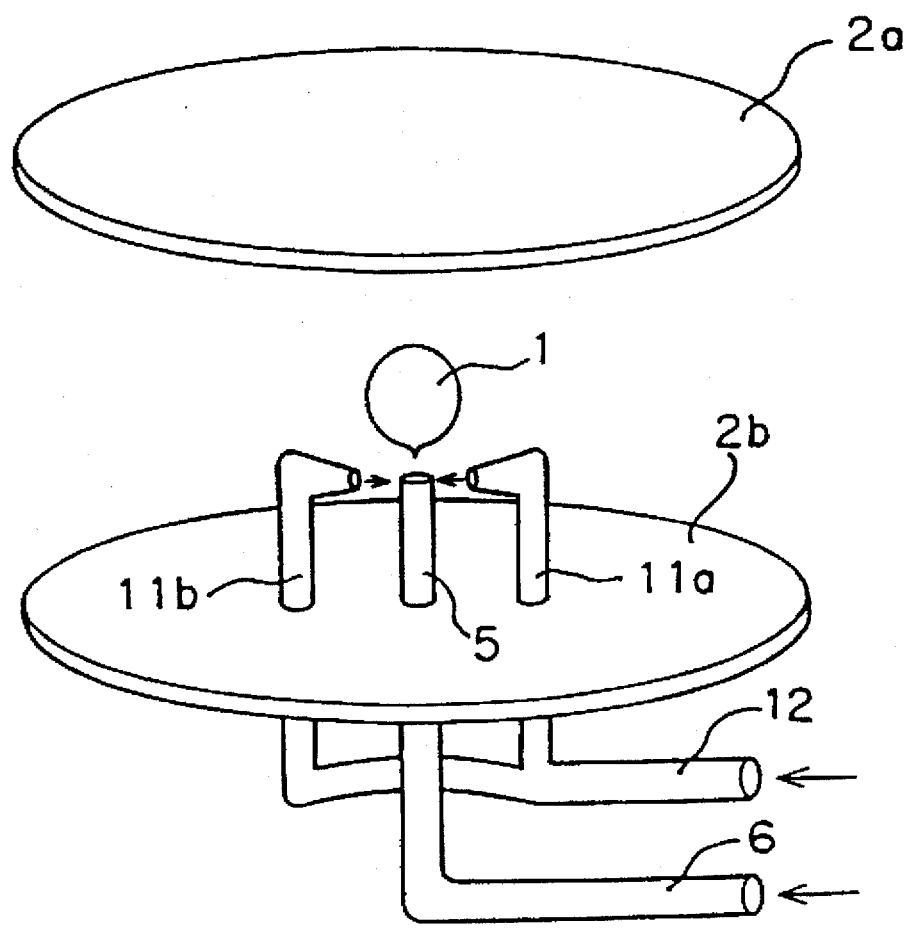
FIG. 3 is a perspective view showing an essential structure of a droplet floating apparatus according to the embodiment 3.

FIG. 3 is a perspective view showing an essential part of a droplet floating apparatus according to one embodiment in the first, the second and the seventh aspects of the present invention, and a structure other than the essential part is identical with that in FIG. 1. In the drawing, reference numerals 11a and 11b are nozzles respectively formed separately from a liquid nozzle 5 to supply gases, and the nozzles have gas ports in the vicinity of a distal end of the liquid nozzle 5.

In the droplet floating apparatus having the above structure, a droplet is formed at the distal end of the liquid nozzle 5, and is separated from the liquid nozzle 5 by gases ejected from the gas nozzles 11a and 11b through a tube 12.

Since the gas nozzles 11a and 11b are respectively formed separately from the liquid nozzle 5 as set forth above, unnecessary liquid never enters the gas nozzles 11a, 11b from the liquid nozzle 5. Further, since pressurized gases can be ejected to the droplet 1 from all directions as well as from a lower direction, it is possible to more effectively separate the droplet 1.

Further, it must be noted that the present invention should not be limited to the two gas nozzles 11a, 11b, and may include one nozzle, or three or more gas nozzles.

Embodiment 4

Figure 4:
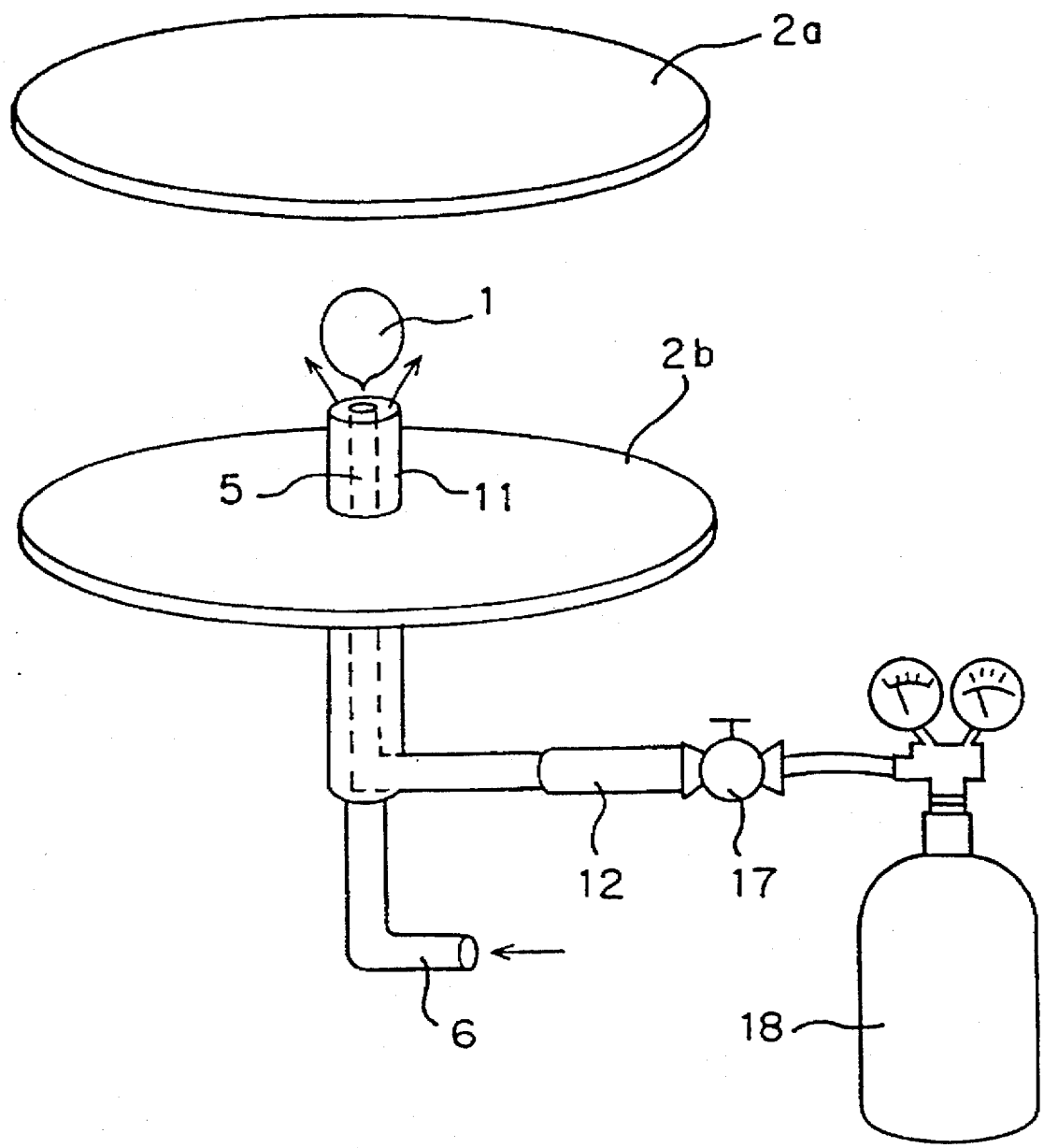
FIG. 4 is a perspective view showing an essential structure of a droplet floating apparatus according to the embodiment 4.

FIG. 4 is a perspective view showing an essential part of a droplet floating apparatus according to another embodiment in the first, the second and the eighth aspects of the present invention. In the embodiment, a bomb 18 is filled with a high pressure gas, and the high pressure gas is ejected from a gas nozzle 11 through a tube 12 by opening a valve 17 to separate a droplet 1 formed at a distal end of a liquid nozzle 5.

As set forth above, according to the embodiment, it is possible to eliminate the need for drive mechanisms such as the cylinder 13a, the electromagnet 14, the power source 15, and the switch 16 as described in the embodiment 1, resulting in a simplified structure.

Embodiment 5

Figure 5:
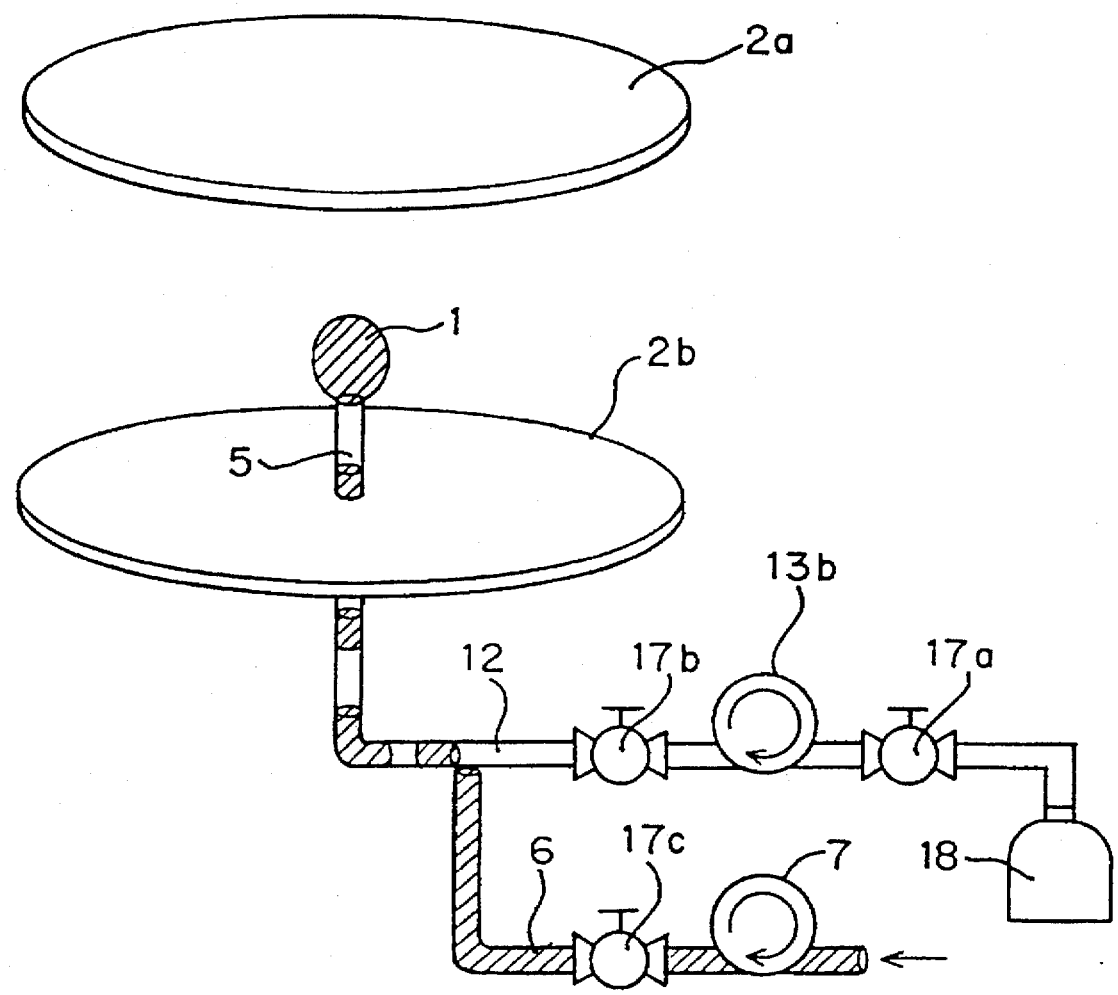
FIG. 5 is a perspective view showing an essential structure of a droplet floating apparatus according to the embodiment 5.

FIG. 5 is a perspective view showing an essential part of a droplet floating apparatus according to one embodiment in the first and the ninth aspects of the present invention. In the drawing, reference numeral 7 is a pump to feed a liquid sample, 13b is a pump to feed a gas, and 17a, 17b and 17c are valves. A nozzle 5 is connected to both of a tube 6 to feed liquid and a tube 12 to feed the gas. A structure other than the above structure is identical with that in FIG. 1.

In the droplet floating apparatus having such a structure, the gas is fed to the nozzle 5 through the tube 12 by opening the valves 17a and 17b, and actuating the pump 13b. Further, the liquid is fed to the nozzle 5 through the tube 6 by opening the valve 17c and actuating the pump 7. The above operation is repeated to alternately feed the gas and the liquid to the nozzle 5 so that the gas and the liquid are alternately present in the nozzle 5. A constant volume of liquid is interposed between the gases in the nozzle 5 to be separated and be formed as a droplet 1 at a distal end of the nozzle 5. The droplet 1 is pushed by the gas behind the droplet 1 so that the droplet 1 is separated from the nozzle 5. In the drawing, the liquid is hatched for clarity.

As set forth above, according to the embodiment, it is possible to eliminate the need for drive mechanisms such as the cylinder 13a, the electromagnet 14, the power source 15, and the switch 16 as described in the embodiment 1, resulting in a simplified structure.

Embodiment 6

Figure 6A:
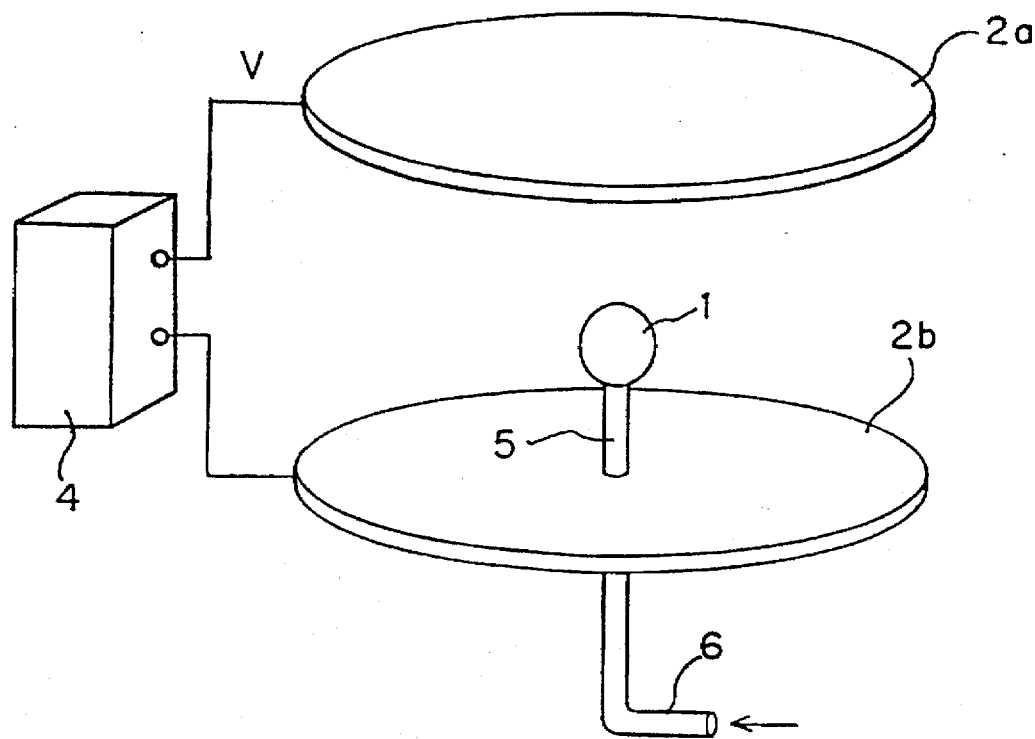
FIG. 6(a) is a perspective view showing an essential structure of a droplet floating apparatus according to the embodiment 6.
Figure 6B:
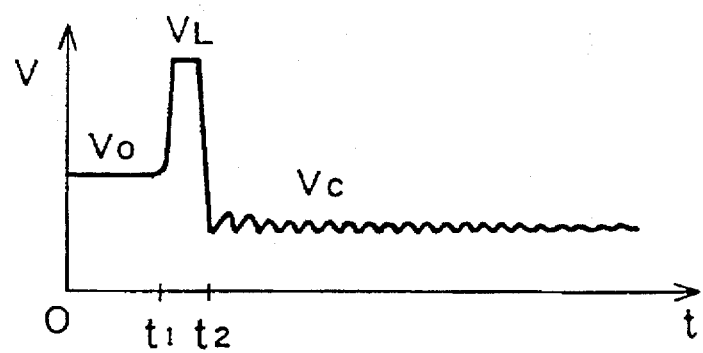
FIG. 6(b) is a characteristic view showing time varying voltage applied to a liquid sample supply pipe and across electrodes opposed thereto.

FIG. 6(a) is a perspective view showing an essential part of a droplet floating apparatus according to one embodiment in the tenth and the eleventh aspects of the present invention, and a structure other than the essential part is identical with that in FIG. 1. FIG. 6(b) is a characteristic view showing time variation of applied voltage. In the drawing, reference numeral 4 means a power source to apply voltage across electrodes 2a and 2b. In the embodiment, a liquid supply nozzle 5 is conductive to be kept at the same potential as that of the electrode 2b, and is opposed to the electrode 2a.

A description will now be given of the operation. A droplet 1 is formed at a distal end of the liquid nozzle 5 through a tube 6. The liquid nozzle 5 and the electrode 2b are at the same potential, and the droplet at the distal end of the liquid nozzle 5 is held by both an electric force caused by voltage V applied from the power source 4, and adsorptivity between the liquid nozzle 5 and the droplet 1. As shown in the time variation of the voltage V in FIG. 6(b), voltage $V_0$ is applied at a time 0, and the droplet 1 at the distal end of the liquid nozzle 5 is held by the electric force caused by the voltage $V_0$ and the adsorptivity between the nozzle 5 and the droplet 1. Subsequently, the voltage is risen to $V_L$ at a time $t_1$. At the same time, an electric force between the droplet 1 and the electrode 2a is increased to exceed the adsorptivity, thereby separating the droplet 1 from the liquid nozzle 5. The separated droplet 1 is held without ambient contact while being floated by voltage $V_c$ at a time $t_2$ or later.

As set forth above, since the droplet 1 is separated by only an electrostatic force according to the embodiment, it is possible to eliminate the need for drive mechanisms such as the cylinder 13a, the electromagnet 14, the power source 15, and the switch 16 as described in the embodiment 1, resulting in a simplified structure. Further, it is possible to stably supply the droplet 1 without splashes at a time of separation.

Embodiment 7

Figure 7:
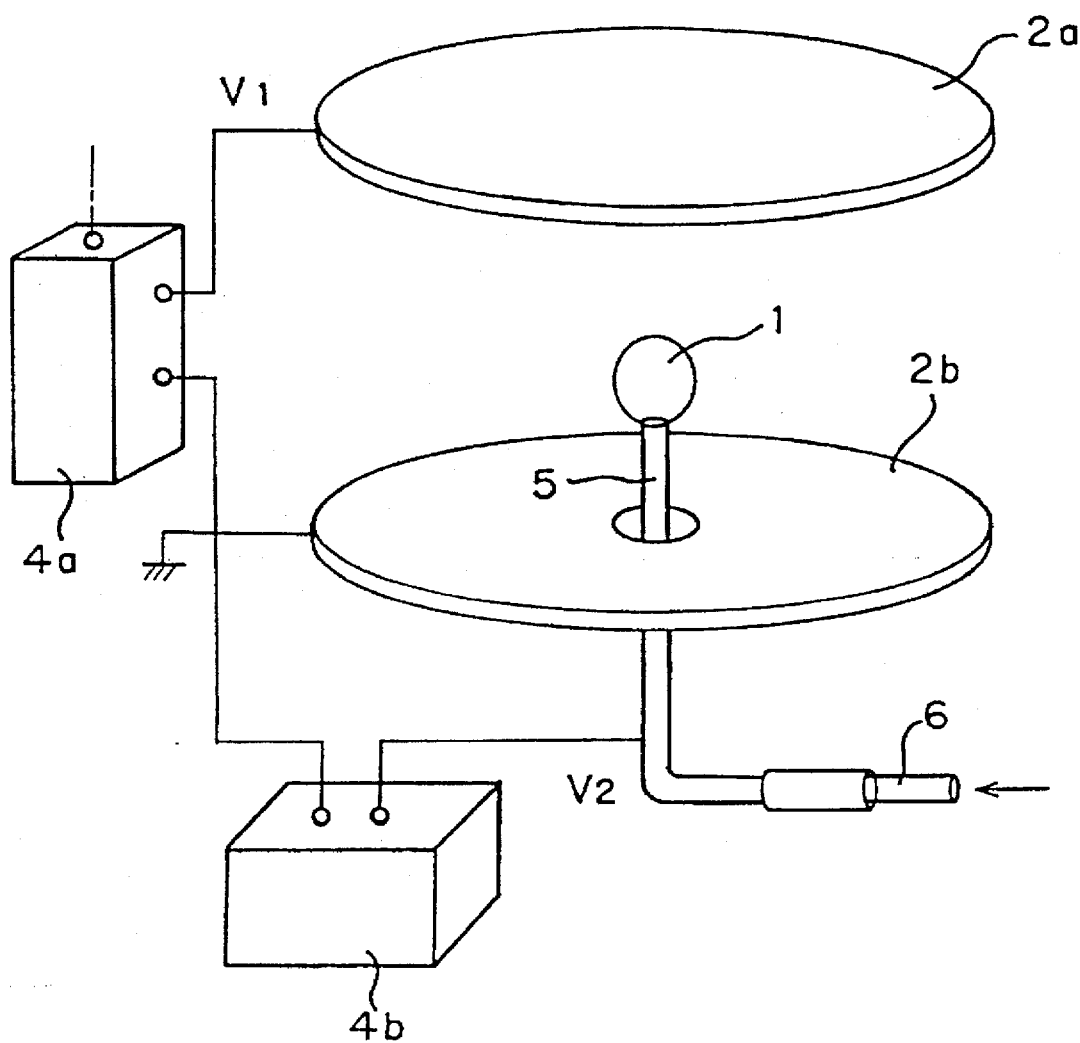
FIG. 7 is a perspective view showing an essential structure of a droplet floating apparatus according to the embodiment 7.

FIG. 7 is a perspective view showing an essential part of a droplet floating apparatus according to another embodiment in the tenth and the eleventh aspects of the present invention, and a structure other than the essential part is identical with that in FIG. 1. In the drawing, reference numeral 4a is a power source to apply voltage across electrodes 2a and 2b, and 4b is a power source to apply voltage between the electrode 2b and a conductive liquid nozzle 5.

A description will now be given of the operation. A droplet 1 is formed at a distal end of the liquid nozzle 5 through a tube 6. The liquid nozzle 5 and the electrode 2b opposed thereto are at the same potential by initially setting output $V_2$ of the power source 4b to zero. The droplet is held by an electric force caused by voltage $V_1$ applied from the power source 4a, and adsorptivity between the liquid nozzle 5 and the droplet 1. Subsequently, the power source 4b is excited to apply the appropriate voltage $V_2$ so as to increase an electrostatic force applied to the droplet 1. Then, the electrostatic force exceeds the adsorptivity between the liquid nozzle 5 and the droplet 1, thereby separating the droplet 1 from the liquid nozzle 5.

As set forth above, the power source 4a used to float and hold the droplet 1 is provided separately from the power source 4b used for separation. As a result, it is possible to limit specifications of the respective power sources, and use inexpensive power sources.

In both the above embodiments 6 and 7, at least the pair of electrodes 2a and 2b are opposed as means for confining the droplet 1 in the floating space. A description has been given of a case where pulse voltage for separation is applied between the one electrode 2a and the liquid nozzle 5. However, it must be noted that the present invention should not be limited to this, and the invention in the tenth aspect can be applied in case the droplet 1 is confined in the floating space by using a sound wave or electromagnetic repulsion. In this case, an electrode for the droplet separation is opposed to the liquid nozzle 5, and the droplet 1 can be separated by applying voltage between the electrode and the liquid nozzle 5.

In the embodiment, since the droplet 1 is separated by only the electrostatic force, it is possible to eliminate the need for drive mechanisms such as the cylinder 13a, the electromagnet 14, the power source 15, and the switch 16 as described in the embodiment 1, resulting in a simplified structure. Further, it is possible to stably supply the droplet without splashes at a time of separation.

Embodiment 8

Figure 8:
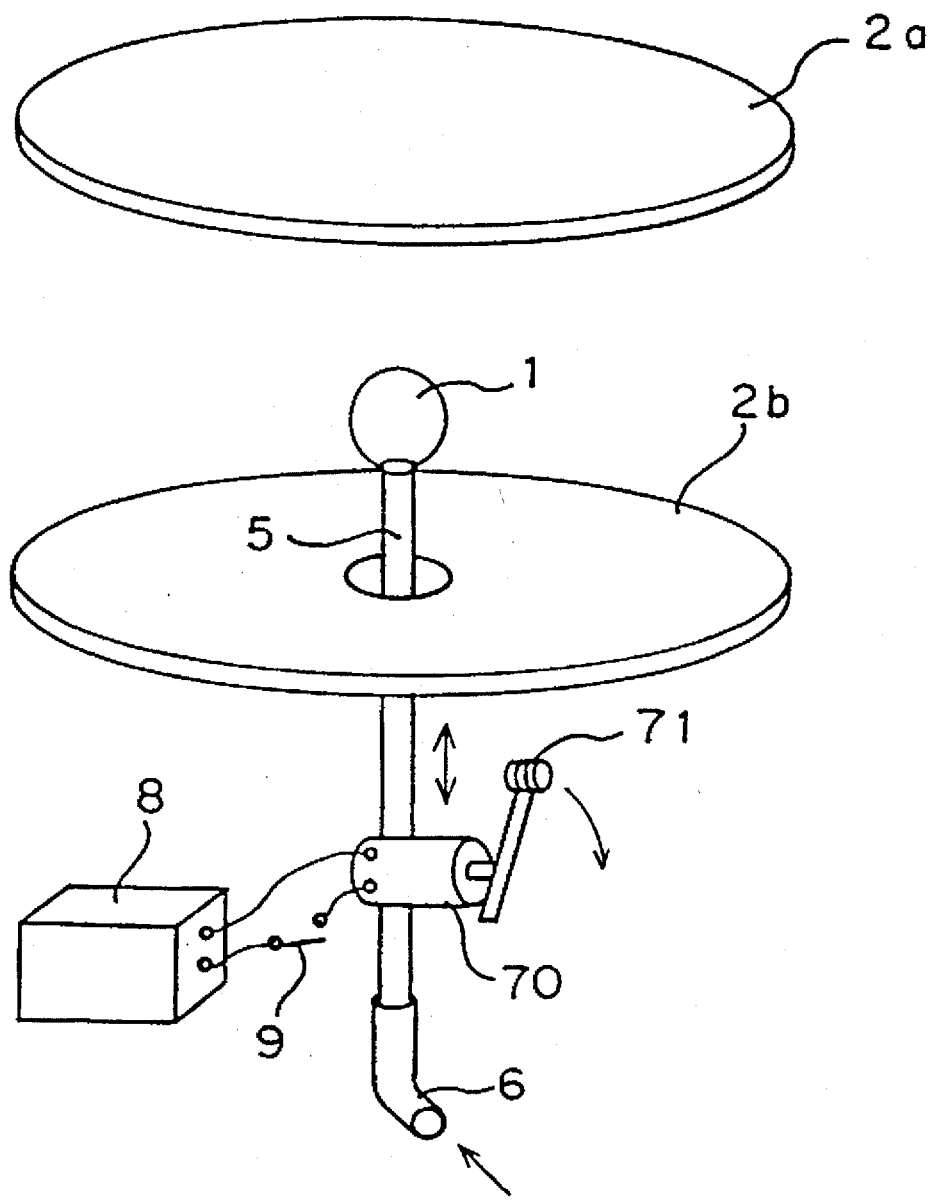
FIG. 8 is a perspective view showing an essential structure of a droplet floating apparatus according to the embodiment 8.

FIG. 8 is a perspective view showing an essential part of a droplet floating apparatus according to one embodiment in the twelfth and the thirteenth aspects of the present invention, and a structure other than the essential part is identical with that in FIG. 1. In the drawing, reference numeral 70 is a motor rigidly secured to a liquid nozzle 5, 71 is an eccentric weight rotatably attached to the motor 70 through a shaft, 8 is a motor power source, and 9 is a switch for the motor.

In the droplet floating apparatus having such a structure, the switch 9 is turned ON to actuate the motor 70 so as to rotate the eccentric weight 71. The eccentric weight 71 is rotated to transmit periodic vibration to the liquid nozzle 5 through the motor 70. A droplet 1 held at a distal end of the liquid nozzle 5 can be separated from the liquid nozzle 5 by periodically vibrating the liquid nozzle 5.

Figure 23:
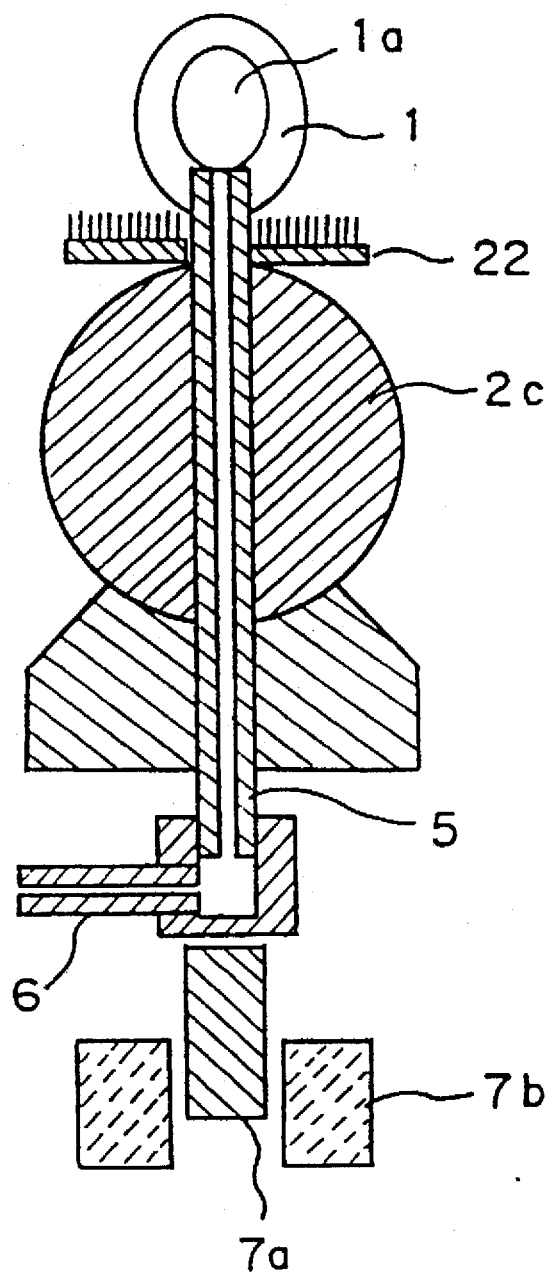
FIG. 23 is an enlarged sectional view showing a nozzle and a part to apply an impact force to the nozzle.

As set forth above, according to the embodiment, the droplet is separated by applying the periodic vibration to the liquid nozzle 5 to reduce adsorptivity between the droplet 1 and the liquid nozzle 5. Therefore, as in the conventional embodiment shown in FIG. 23, a large impact force is required to separate the droplet 1 by a solenoid hitting a lower portion of the liquid nozzle 5, and the droplet 1 may possibly be splashed. Unlike the conventional embodiment, in the embodiment, an impact force for each time may be small, and the droplet 1 is never splashed, resulting in stable supply of the droplet 1 into a floating space. Further, it is possible to easily provide the optimal period and the optimal number of revolutions by selecting a type of the weight 71 and the number of revolutions thereof.

Embodiment 9

Figure 9:
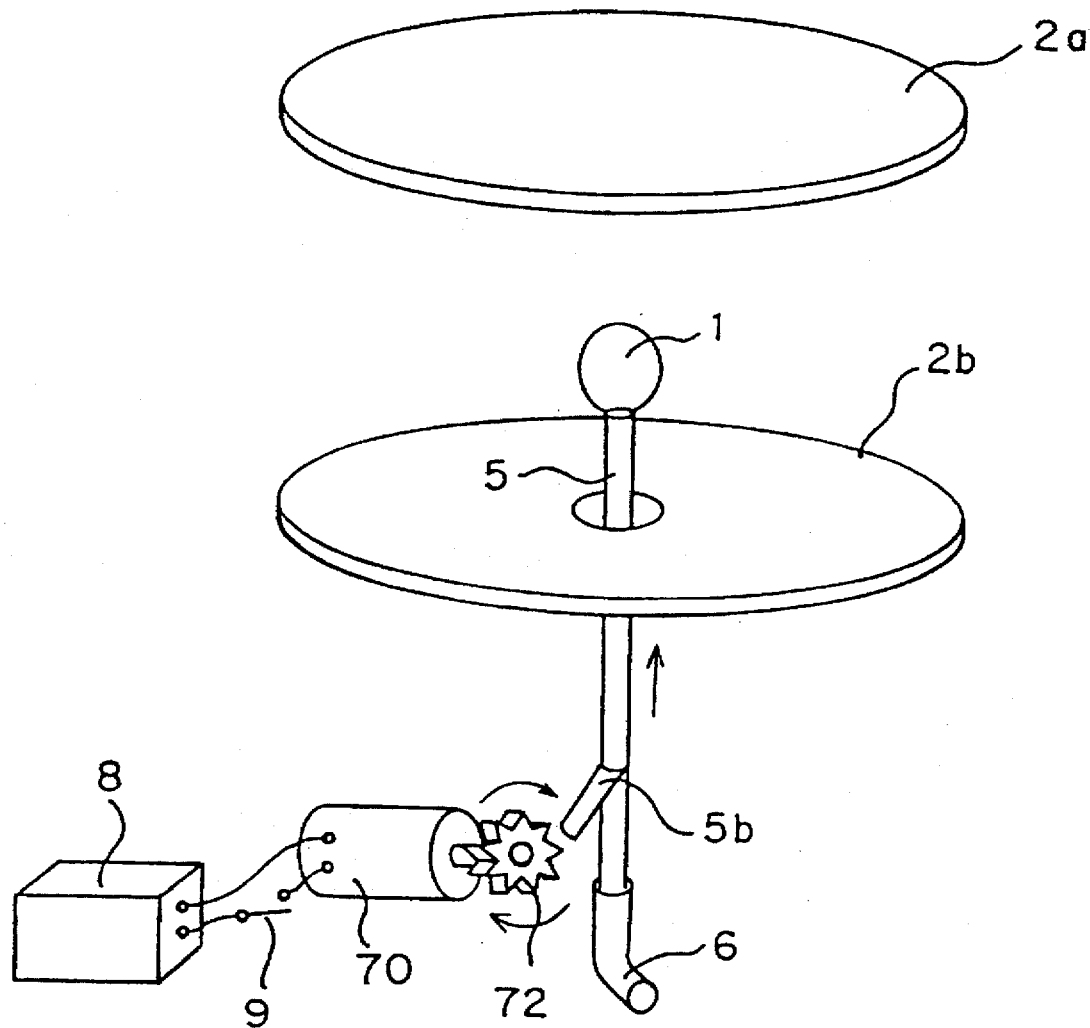
FIG. 9 is a perspective view showing an essential structure of a droplet floating apparatus according to the embodiment 9.

FIG. 9 is a perspective view showing an essential part of a droplet floating apparatus according to one embodiment in the twelfth and the fourteenth aspects of the present invention, and a structure other than the essential part is identical with that in FIG. 1. In the drawing, reference numeral 5b is a projecting portion extending from a liquid nozzle, and 72 is a gear attached to a motor 70.

A description will now be given of the operation. The switch 9 is turned ON to actuate the motor 70 so as to rotate the gear 72. The gear 72 hits the projection 5b of the liquid nozzle while rotating, and its periodic vibration is transmitted to the liquid nozzle 5. A droplet 1 is held at a distal end of the liquid nozzle 5, and the liquid nozzle 5 is periodically vibrated to separate the droplet 1 from the liquid nozzle 5.

As set forth above, according to the embodiment, it is possible to provide rapid vibration for the liquid nozzle 5 by the gear 72 in addition to the same effects as those in the embodiment 8. As a result, the droplet 1 can be separated by smaller amplitude, and more stable supply is enabled.

In the embodiment, a description has been given of a case where the gear 72 serves as a rotator having the projection. However, it must be noted that the present invention should not be limited to this, and the rotator may include a cam or the like.

Embodiment 10

Figure 10:
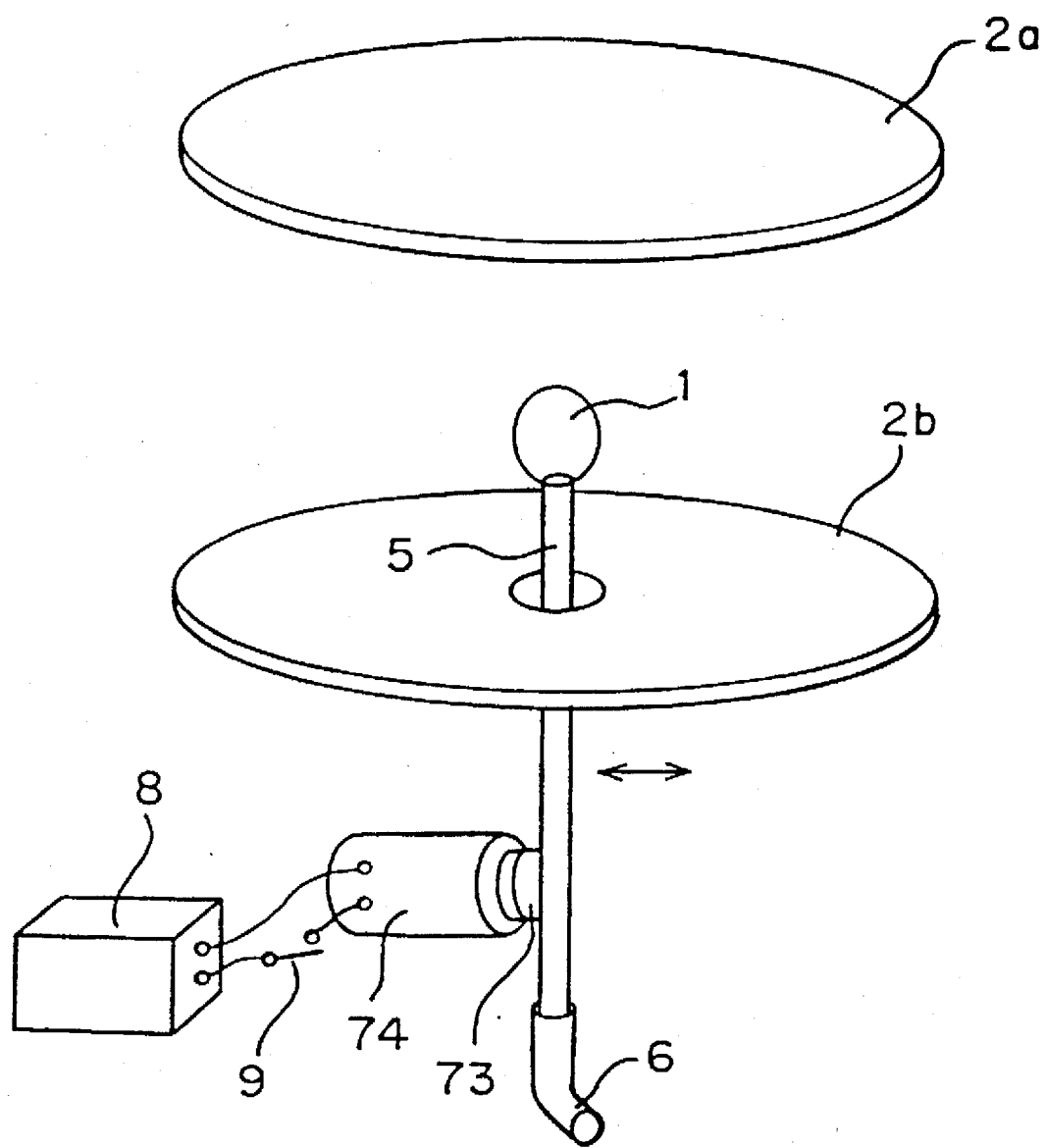
FIG. 10 is a perspective view showing an essential structure of a droplet floating apparatus according to the embodiment 10.

FIG. 10 is a perspective view showing an essential part of a droplet floating apparatus according to one embodiment in the twelfth and the fifteenth aspects of the present invention, and a structure other than the essential part is identical with that in FIG. 1. In the drawing, reference numeral 73, is an ultrasonic vibrator disposed in contact with a liquid nozzle 5, and 74 is a drive unit for the ultrasonic vibrator.

In the droplet floating apparatus having the above structure, the switch 9 is turned ON to actuate the ultrasonic vibrator 73 so as to periodically vibrate the liquid nozzle 5 in contact with the ultrasonic vibrator. A droplet 1 is held at a distal end of the liquid nozzle 5, and the liquid nozzle 5 is vibrated to separate the droplet 1 from the liquid nozzle 5.

Thus, in the embodiment, it is also possible to provide the same effects as those in the embodiment 9.

Embodiment 11

Figure 11:
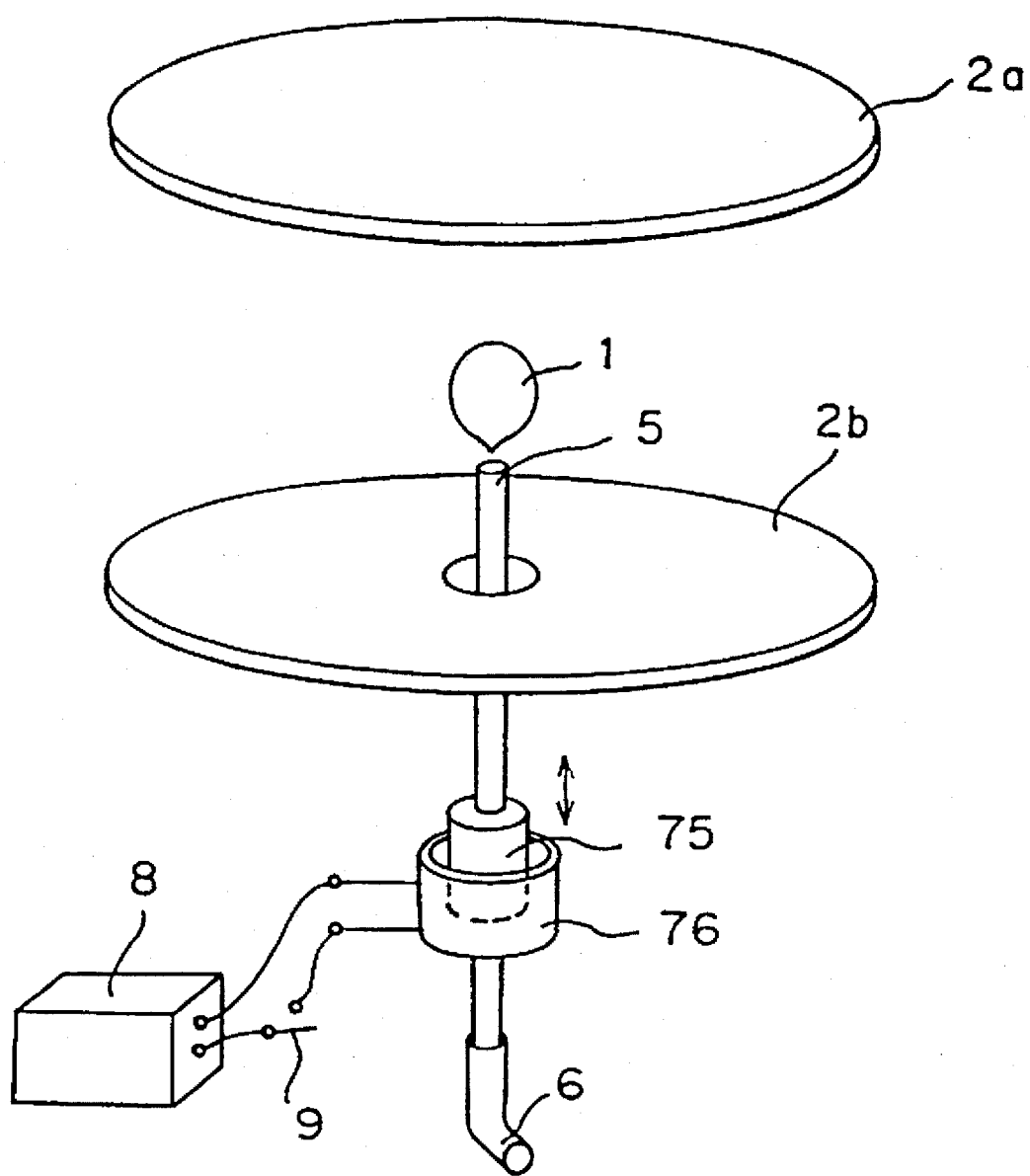
FIG. 11 is a perspective view showing an essential structure of a droplet floating apparatus according to the embodiment 11.

FIG. 11 is a perspective view showing an essential part of a droplet floating apparatus according to one embodiment in the twelfth and the sixteenth aspects of the present invention, and a structure other than the essential part is identical with that in FIG. 1. In the drawing, reference numeral 75 is a magnetic material rigidly secured to a liquid nozzle 5, and 76 is a coil surrounding the magnetic material.

In the droplet floating apparatus having the above structure, a switch 9 is turned ON to cause an ac current flow or a pulse current flow in the coil 76. Consequently, a magnetic field is generated in the coil 76 to periodically vibrate the magnetic material 75 in a vertical direction. A droplet 1 is held at a distal end of the liquid nozzle 5, and the liquid nozzle 5 is periodically vibrated in the vertical direction to separate the droplet 1 from the liquid nozzle 5.

Thus, in the embodiment, it is also possible to provide the same effects as those in the embodiment 9.

Embodiment 12

Figure 12:
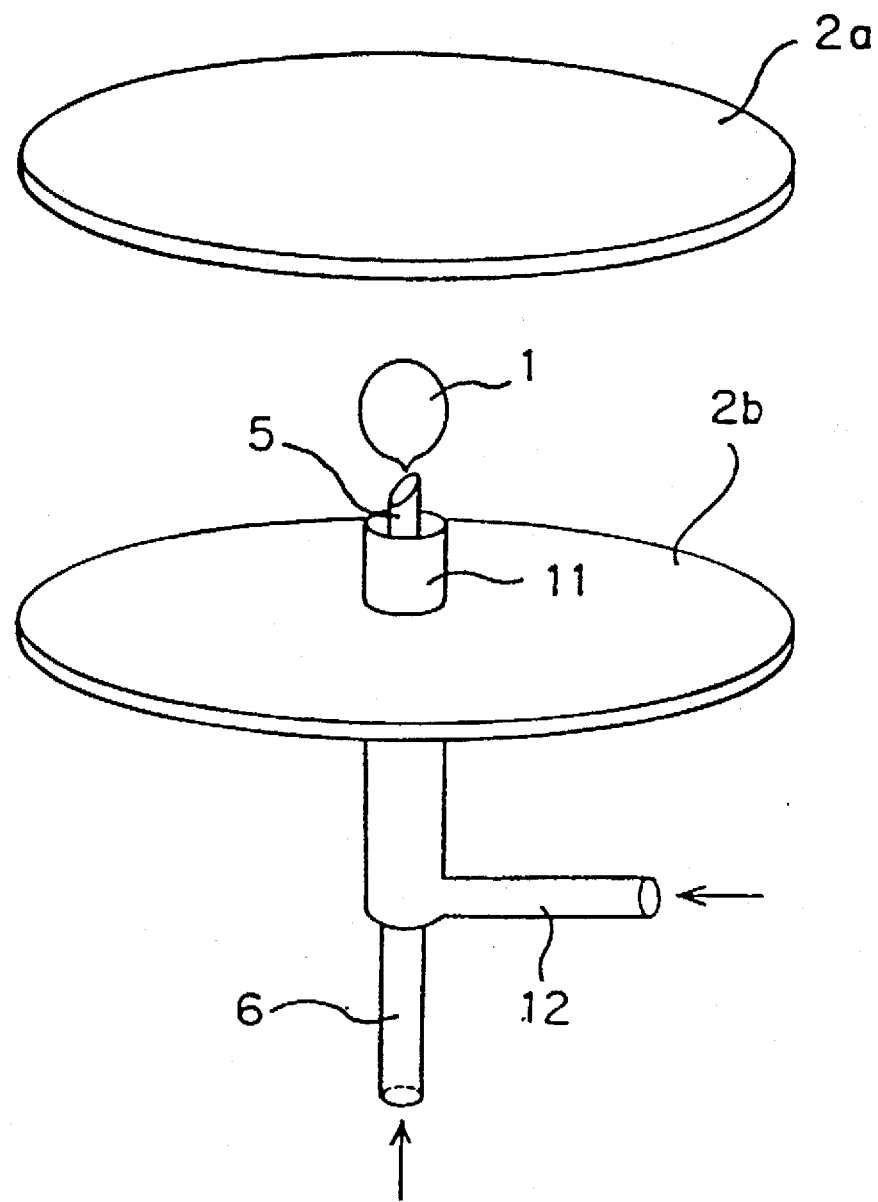
FIG. 12 is a perspective view showing an essential structure of a droplet floating apparatus according to the embodiment 12.

FIG. 12 is a perspective view showing an essential part of a droplet floating apparatus according to one embodiment in the seventeenth aspect of the present invention, and a structure other than the essential part is identical with that in FIG. 1. In the embodiment, a distal end of the a liquid nozzle 5 is cut away diagonally with respect to an axis of the liquid nozzle 5 so as to reduce adsorptivity between a droplet 1 and the liquid nozzle 5. Hence, it is possible to easily separate the droplet 1 formed at the distal end of the liquid nozzle 5 by a gas ejected from a gas nozzle 11. The gas nozzle 11 is disposed on the lateral side of the liquid nozzle 5.

In the embodiment, a description has been given of a case where the seventeenth aspect is applied to the liquid nozzle 5 according to the embodiment 2 described in FIG. 2. However, it must be noted that the present invention should not be limited to this, and the invention in the seventeenth aspect may be applied to liquid nozzles 5 employed in other embodiments so as to provide the same effects.

Embodiment 13

Figure 13:
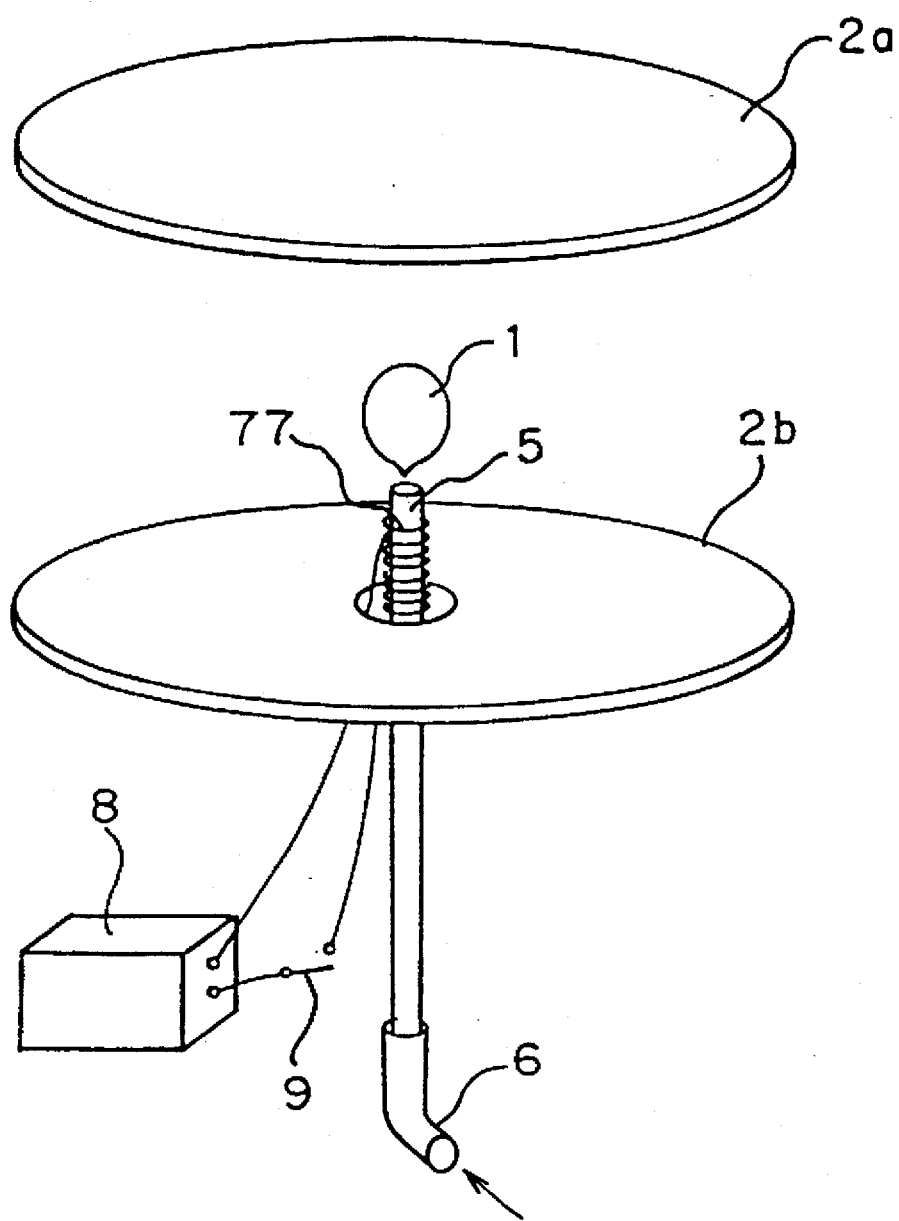
FIG. 13 is a perspective view showing an essential structure of a droplet floating apparatus according to the embodiment 13.

FIG. 13 is a perspective view showing an essential part of a droplet floating apparatus according to one embodiment in the eighteenth and the nineteenth aspects of the present invention, and a structure other than the essential part is identical with that in FIG. 1. In the drawing, reference numeral 77 is a heater including a heating wire wound on a distal end of a liquid nozzle 5, 8 is a power source for the heater, and 9 is a switch for the heater.

In the droplet floating apparatus having the above structure, the switch 9 is turned ON to cause a current flow in the heater 77 so as to heat the distal end of the liquid nozzle 5. A droplet 1 is held at the distal end of the liquid nozzle 5 by an electrostatic force and adsorptivity. When the distal end of the liquid nozzle 5 is heated, a temperature of the droplet 1 at a lower portion in contact with the liquid nozzle 5 is increased, thereby reducing the adsorptivity between the liquid nozzle 5 and the droplet 1. Finally, the electrostatic force exceeds the adsorptivity to separate the droplet 1 from the liquid nozzle 5.

Therefore, it is possible to easily separate the droplet 1, and stably supply the droplet into a floating space without splashes. Further, it is possible to easily control an amount of heating by using the electric heater 77.

Embodiment 14

Figure 14:
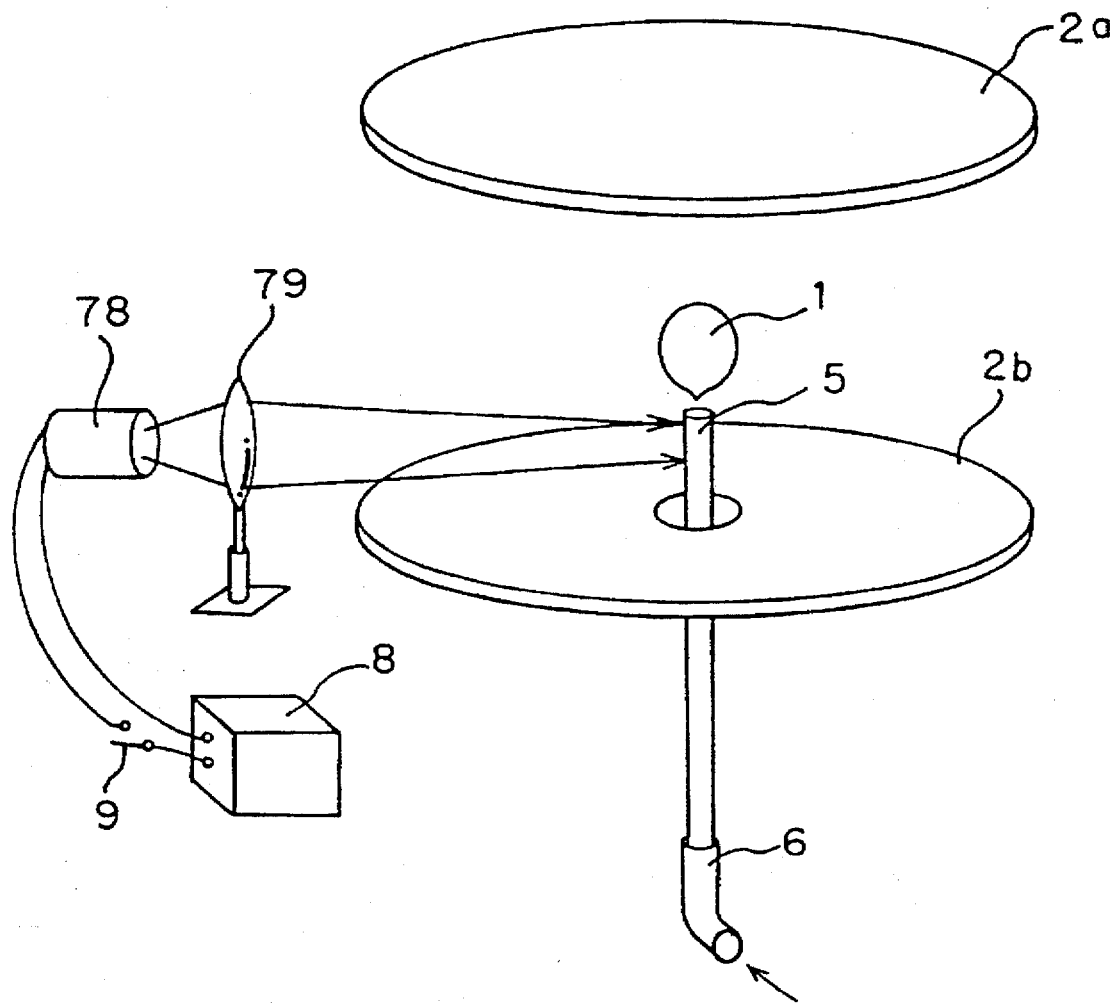
FIG. 14 is a perspective view showing an essential structure of a droplet floating apparatus according to the embodiment 14.

FIG. 14 is a perspective view showing an essential part of a droplet floating apparatus according to another embodiment in the eighteenth and the nineteenth aspects of the present invention, and a structure other than the essential part is identical with that in FIG. 1. In the drawing, reference numeral 78 is an apparatus for irradiation of infrared ray, 79 is a lens to focus the irradiation of infrared ray at a distal end of a liquid nozzle 5, 8 is a power source for the irradiation apparatus, and 9 is a switch.

In the droplet floating apparatus having the above structure, the switch 9 is turned ON to focus the infrared ray emitted from the infrared ray irradiation apparatus 78 at the distal end of the liquid nozzle 5 by a condenser lens 79, thereby heating the distal end of the liquid nozzle 5. A droplet 1 is held at the distal end of the liquid nozzle 5 by an electrostatic force and adsorptivity. As in the embodiment 13, the droplet 1 is separated from the liquid nozzle 5.

Therefore, according to the embodiment, as in the embodiment 13, it is possible to easily separate the droplet 1, and stably supply the droplet into a floating space without splashes. Further, it is possible to easily control an amount of heating by using the infrared ray irradiation apparatus 78.

Embodiment 15

Figure 15:
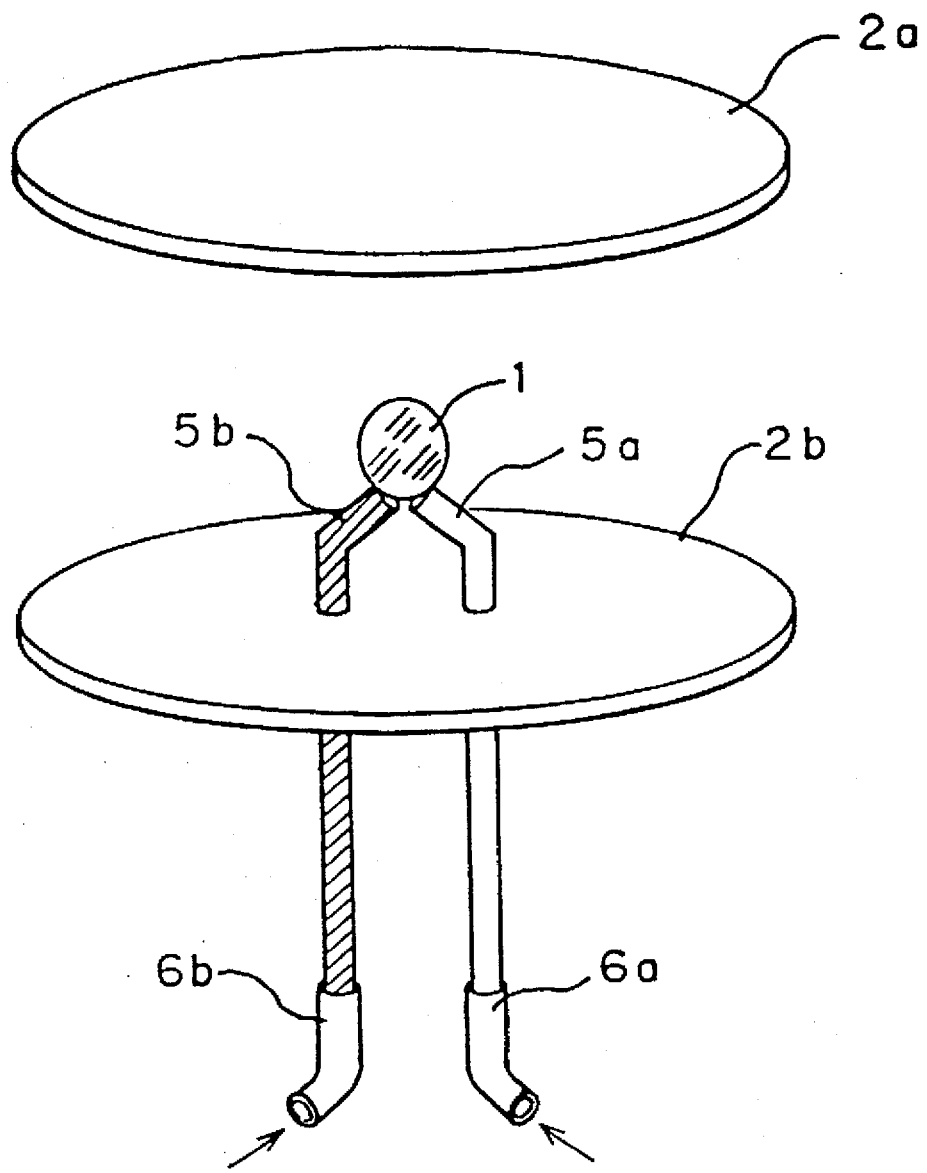
FIG. 15 is a perspective view showing an essential structure of a droplet floating apparatus according to the embodiment 15.

FIG. 15 is a perspective view showing an essential part of a droplet floating apparatus according to one embodiment in the twentieth and twenty-first aspects of the present invention, and a structure other than the essential part is identical with that in FIG. 1. In the drawing, reference numerals $5a$ and $5b$ are liquid nozzles to respectively supply liquid samples 1 and 2, and distal ends thereof are disposed in close proximity to one another. Reference numerals $6a$ and $6b$ mean tubes to respectively feed the liquid samples 1 and 2 into the liquid nozzles $5a$ and $5b$.

In the droplet floating apparatus having the above structure, the different liquid samples 1 and 2 are fed from the liquid nozzles $5a$ and $5b$. The two types of liquids are mixed to form one droplet 1 on distal ends of both the nozzles $5a$ and $5b$ disposed in close proximity to one another. Thereafter, the droplet 1 is separated from both the nozzles $5a$ and $5b$ by any one of the means described in the above embodiments, and the mixed droplet 1 is supplied between electrodes $2a$ and $2b$. For purpose of explanation, the drawing shows a typical state in which the two of liquid samples 1 and 2 are mixed to form the droplet 1 with the liquid sample 2 hatched. However, in reality, the liquid samples can not be mixed in a mottled manner as shown in the drawing.

As set forth above, according to the embodiment, it is possible to simultaneously supply the two types of liquid samples, and concurrently mix the two liquid samples immediately before starting to hold the droplet 1 in a floating space without contact. As a result, control can be made so as not to cause proceeding of chemical reaction or the like in the mixed sample by the time immediately before holding the droplet without contact.

Embodiment 16

Figure 16:
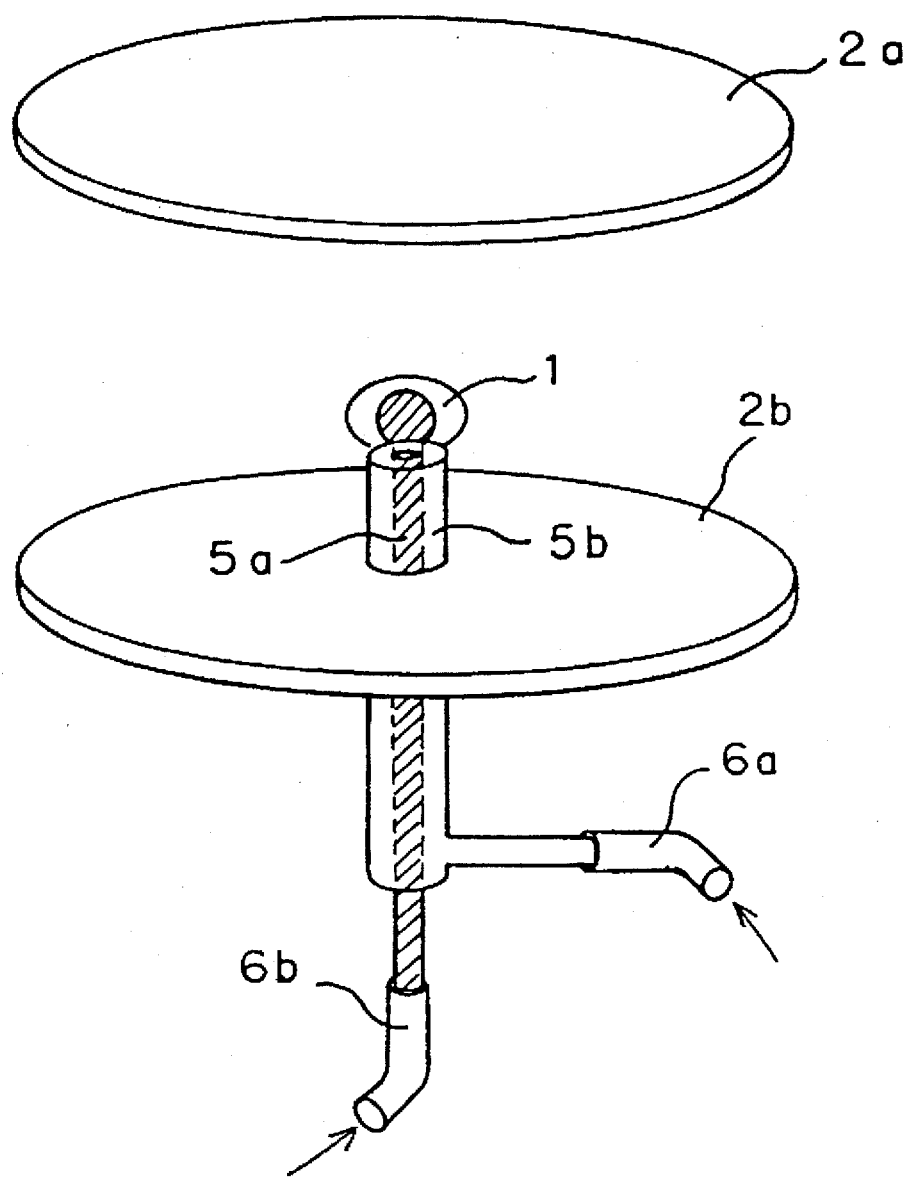
FIG. 16 is a perspective view showing an essential structure of a droplet floating apparatus according to the embodiment 16.

FIG. 16 is a perspective view showing an essential part of a droplet floating apparatus according to another embodiment in the twentieth and twenty-first aspects of the present invention, and a structure other than the essential part is identical with that in FIG. 1. In the embodiment, two inner and outer nozzles $5a$ and $5b$ for supplying liquid samples 1 and 2 form one double tube. In the drawing, the liquid sample 2 is hatched as in the case of FIG. 15.

In the droplet floating apparatus having the above structure, the two types of liquid samples 1, 2 are supplied to be mixed at distal ends of the nozzles $5a$ and $5b$ and be separated therefrom as in the above embodiment 15. As a result, in addition to the same effects as those in the embodiment 15, the apparent number of the nozzles $5a$, $5b$ extending from a surface of an electrode $2a$ can be reduced to one, and adverse effects to a floating space can be reduced since the two nozzles $5a$ and $5b$ in the embodiment have a double tube structure.

In the embodiment, for example, a triple tube may be provided to supply the liquid samples 1 and 2 from two tubes thereof, and supply a pressurized gas from the remaining one tube thereof so as to separate the droplet 1. In this case, the droplet floating apparatus can be provided with a compact structure.

Embodiment 17

Figure 17:
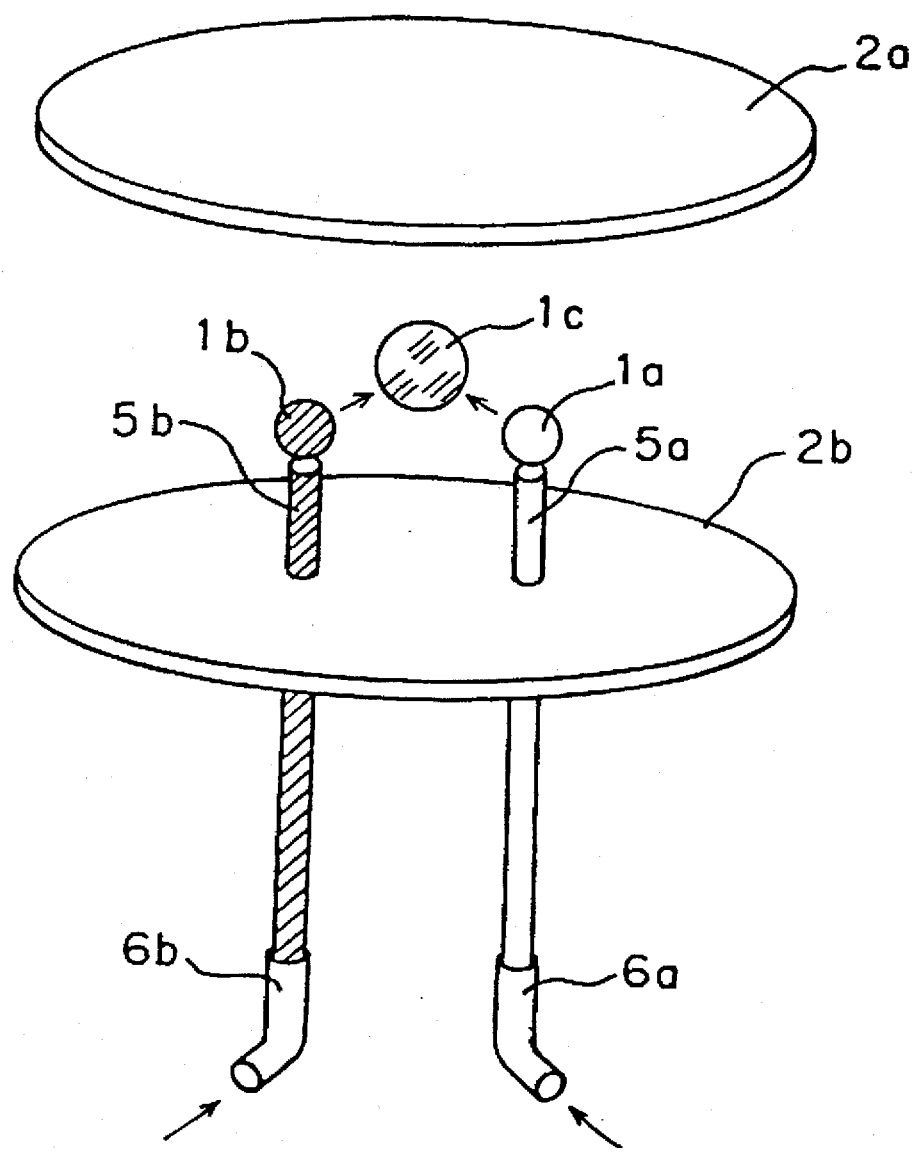
FIG. 17 is a perspective view showing an essential structure of a droplet floating apparatus according to the embodiment 17.

FIG. 17 is a perspective view showing an essential part of a droplet floating apparatus according to one embodiment in the twentieth and the twenty-second aspects of the present invention, and a structure other than the essential part is identical with that in FIG. 1. In the drawing, reference numerals $1a$ and $1b$ are respective droplets of liquid samples 1 and 2 formed at distal ends of liquid nozzles $5a$ and $5b$, and $1c$ is a droplet formed by mixing the two types of liquid samples. As in the case of FIG. 15, the liquid sample 2 is hatched in the drawing.

In the embodiment, the distal ends of the two liquid nozzles $5a$ and $5b$ are spaced apart from one another with a predetermined interval. The liquid samples 1 and 2 are supplied into the respective nozzles $5a$ and $5b$ to form the droplets $1a$ and $1b$ at the distal ends of the nozzles, respectively. The two nozzles $5a$ and $5b$ are spaced apart from one another so that the droplets are not mixed in this state. Thereafter, as in the embodiment 15, the respective droplets $1a$ and $1b$ are separated from the two nozzles $5a$ and $5b$. The two separated droplets $1a$ and $1b$ are moved to a holding center position between electrodes $2a$ and $2b$, and are mixed thereat to form the one droplet $1c$. The droplet $1c$ is held between the electrodes $2a$ and $2b$.

As set forth above, according to the embodiment, it is possible to simultaneously supply the two types of liquid samples, and concurrently mix the two types of liquid samples 1, 2 after separation from the nozzles $5a$ and $5b$. Further, control can be made so as not to cause proceeding of chemical reaction or the like in the mixed sample by the time when the droplet is held without contact.

In the above embodiments 15 to 17, descriptions have been given of a case where the two liquid samples 1 and 2 are supplied by using the two nozzles $5a$ and $5b$. However, it must be noted that the present invention should not be limited to the above number of nozzles $5a$, $5b$, and the above number of types of supplied liquid samples.

Embodiment 18

Figure 18:
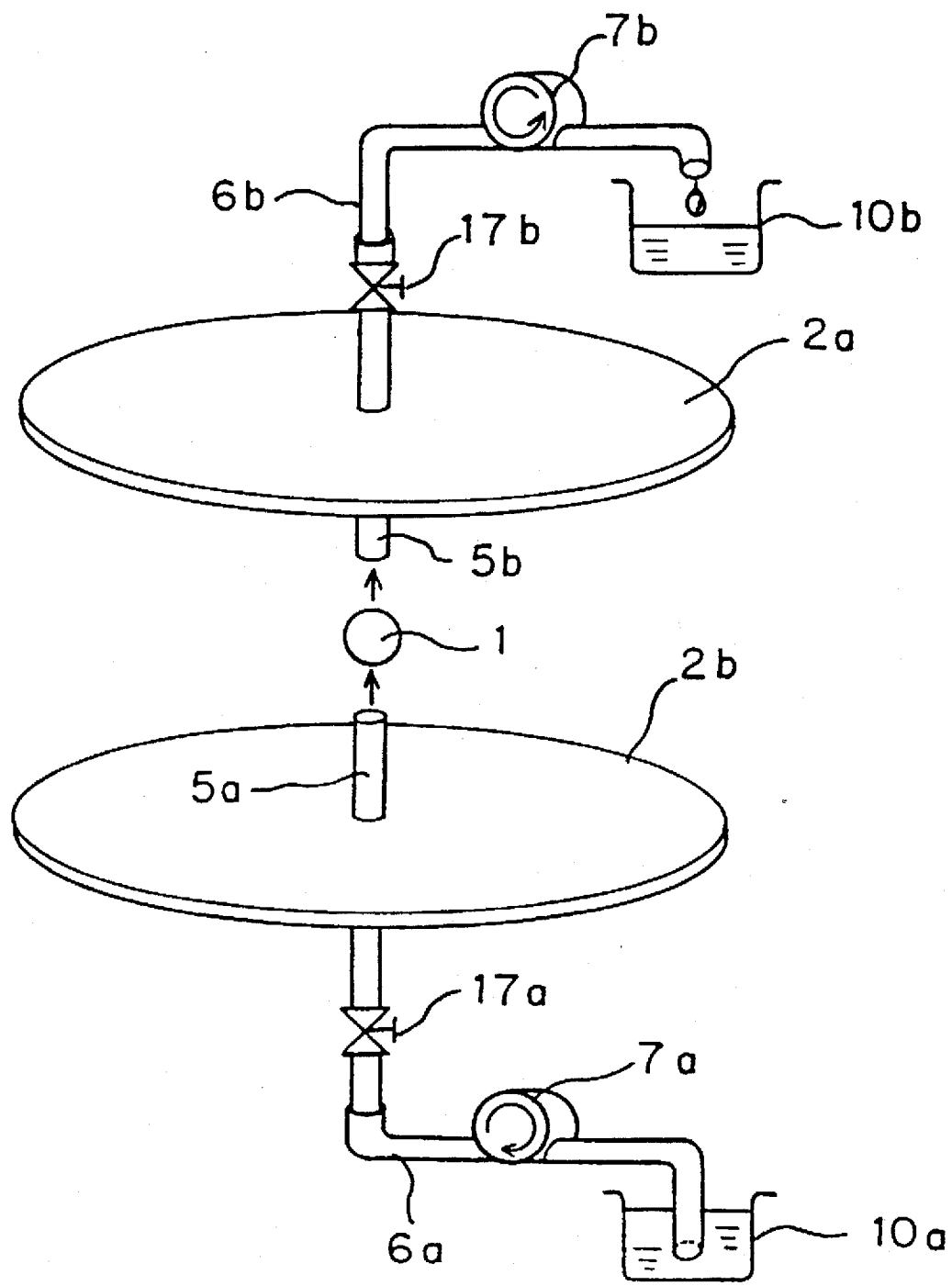
FIG. 18 is a perspective view showing an essential structure of a droplet floating apparatus according to the embodiment 18.

FIG. 18 is a perspective view showing an essential part of a droplet floating apparatus according to one embodiment in the twenty-third and the twenty-fourth aspects of the present invention, and a structure other than the essential part is identical with that in FIG. 1. In the drawing, reference numerals $5b$, $6b$ are a nozzle and a tube to respectively recover a droplet 1, $17a$ and $17b$ are valves respectively provided for tubes $6a$, $6b$, $7a$ is a pump to supply a liquid sample, $7b$ is a pump to recover the droplet 1, $10a$ is a container to store the liquid sample, and $10b$ is another container to store the recovered liquid.

A description will now be given of the operation. The liquid sample stored in the container $10a$ is supplied by the pump $7a$ into a liquid nozzle $5a$ through the tube $6a$, and the valve $17a$ to form the droplet 1 at a distal end of the nozzle $5a$. Thereafter, the droplet 1 is separated from the liquid nozzle $5a$, and is controlled by a position control mechanism to be positioned and held between electrodes $2a$ and $2b$ as described in the embodiment 1. After treatments such as measuring treatment and heating treatment between the electrodes $2a$ and $2b$, the droplet 1 is transported by the position control mechanism to a distal end of the recovery nozzle 5b. The valve 17b is opened and the pump 7b is actuated to transport the droplet 1 adhered to the distal end of the recovery nozzle 5b to the container 10b through the tube 6b for storage.

As set forth above, according to the embodiment, the droplet can be easily recovered.

Embodiment 19

Figure 19:
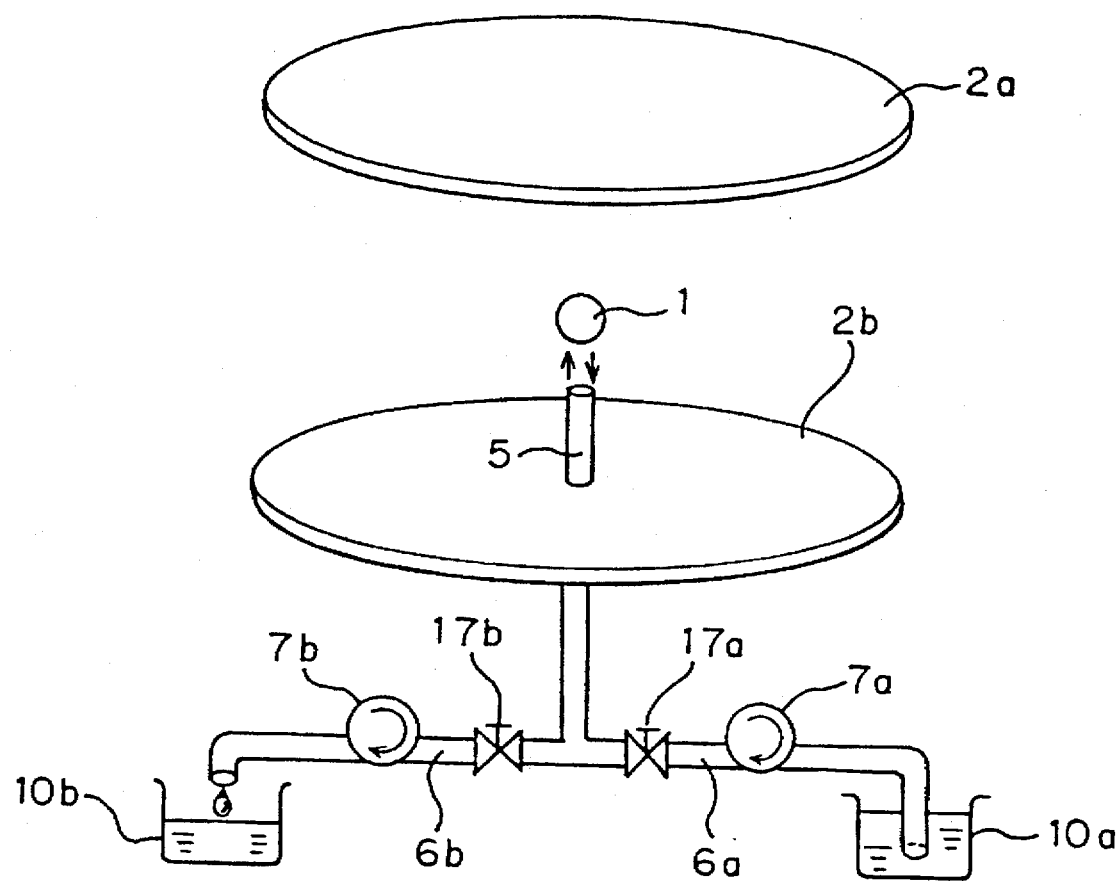
FIG. 19 is a perspective view showing an essential structure of a droplet floating apparatus according to the embodiment 19.

FIG. 19 is a perspective view showing an essential part of a droplet floating apparatus according to one embodiment in the twenty-third and the twenty-fifth aspects of the present invention, and a structure other than the essential part is identical with that in FIG. 1. In the embodiment, a liquid nozzle 5 serves as a liquid sample supply pipe, and also serves as a droplet recovery pipe. As a result, it is possible to provide the same effects as those in the embodiment 18, and provide a more simplified structure than that in the embodiment 18.

Embodiment 20

Figure 20:
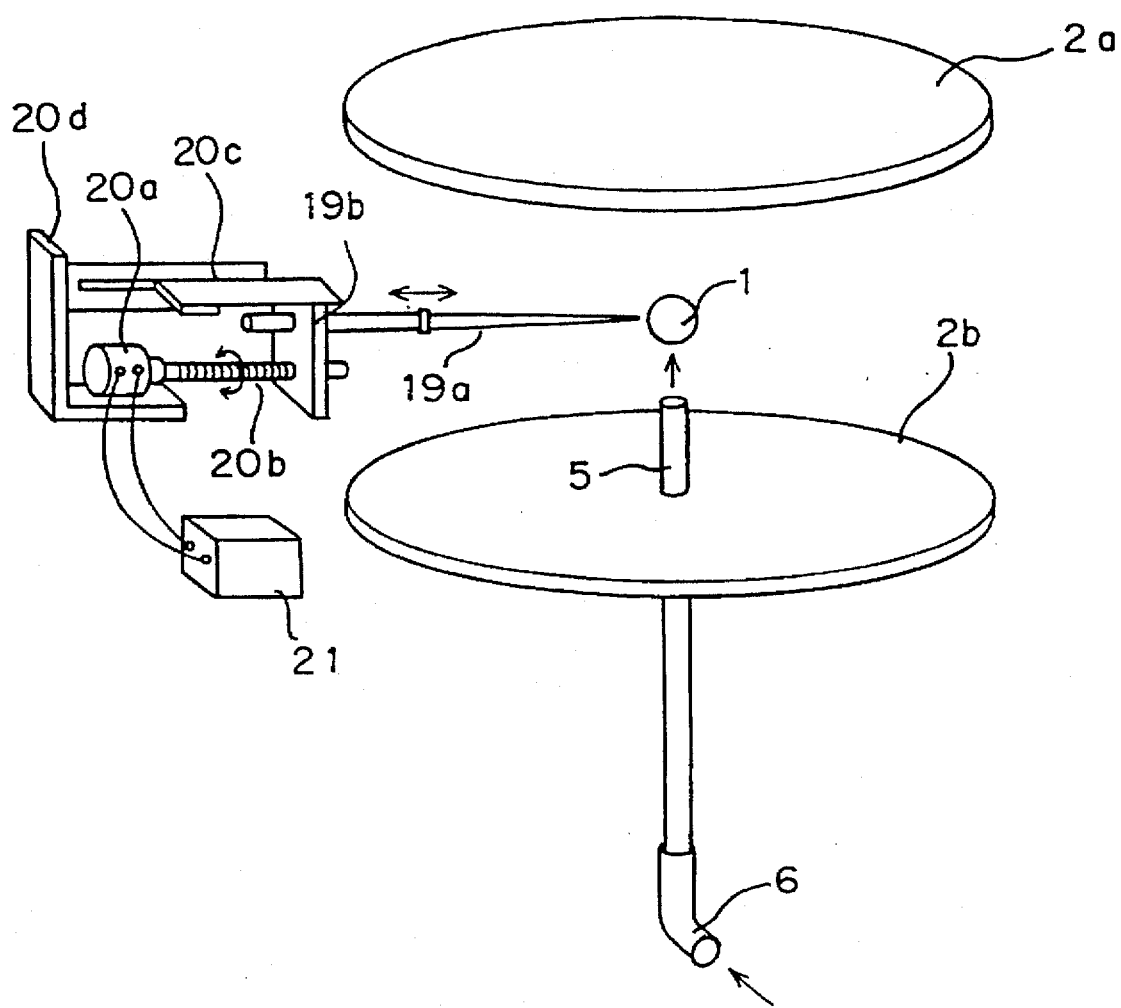
FIG. 20 is a perspective view showing an essential structure of a droplet floating apparatus according to the embodiment 20.

FIG. 20 is a perspective view showing an essential part of a droplet floating apparatus according to one embodiment in the twenty-third, the twenty-sixth and the twenty-seventh aspects of the present invention, and a structure other than the essential part is identical with that in FIG. 1. In the drawing, reference numeral 19a is an adsorber (i.e., a needle in the embodiment) inserted into a floating space, that is, between electrodes 2a and 2b to adsorb and recover a droplet 1, and 19b is a holding member to hold the needle 19a. A description will now be given of a drive mechanism of the needle 19a. Reference numeral 20a means a motor fixed to a fixed base 20d, 20b is a screw member which is rotated by the motor 20a to be screwed with the holding member 19b, 20c is a guide fixed on the holding member 19b to be moved along a groove provided in a fixed member 20d, and 21 is a power source for the motor 20a.

In the droplet floating apparatus having the above structure, a description will chiefly be given of recovery operation of the droplet 1. The power source 21 is turned ON to rotate the screw member 20b together with the motor 20a, and the holding member 19b is moved along the guide 20c to insert the needle 19a between the electrodes 2a and 2b, thereby contacting the needle 19a with the droplet 1 which is held without contact. The droplet 1 is adhered to a distal end of the needle 19a by adsorptivity between the needle 19a and the droplet 1. Subsequently, the droplet 1 can be recovered together with the needle 19a from between the electrodes 2a and 2b by rotating the screw member 20b in a direction opposed to that at a time of insertion.

The adsorptivity between the droplet 1 adhered to the distal end of the needle 19a and the needle 19a is relatively small. Therefore, it is also possible to recover the droplet 1 onto a surface of some object by an additional step of, for example, contacting the needle 19a having the adhered droplet 1 with the some object after recovery.

As set forth above, the droplet 1 can be easily recovered according to the embodiment.

Embodiment 21

Figure 21:
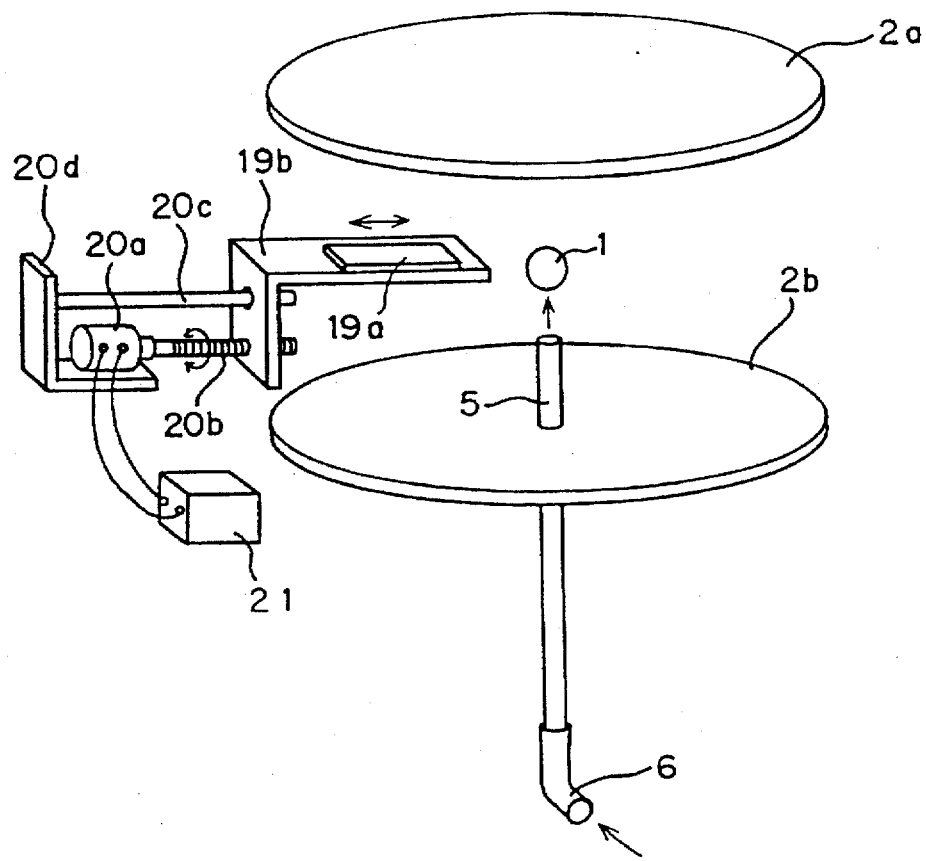
FIG. 21 is a perspective view showing an essential structure of a droplet floating apparatus according to the embodiment 21.
Figure 22:
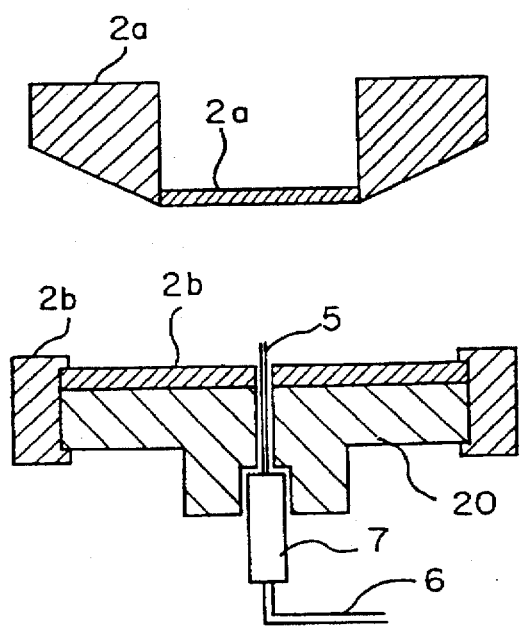
FIG. 22 is a sectional view showing a structure of a conventional droplet floating apparatus.

FIG. 21 is a perspective view showing an essential part of a droplet floating apparatus according to another embodiment in the twenty-third, the twenty-sixth and the twenty-seventh aspects of the present invention, and a structure other than the essential part is identical with that in FIG. 1. The embodiment is different from the above embodiment 20 in a sheet-like form of an adsorber 19a. A droplet 1 is adhered to a surface of a plate 19a inserted into a floating space, and can be easily recovered.

In the embodiment, for example, a slide glass may be employed as the plate 19a. In this case, it is possible to directly treat the recovered droplet 1 as sample for microscopical observation or the like.

In the above embodiments 18 to 21, descriptions have been given of a case where the droplet is recovered after treatments such as measuring treatment and heating treatment. However, it must be noted that the supplied sample should not be limited to the liquid sample, and the present invention in the twenty-third to the twenty-seventh aspects may be applied in case the sample is supplied in a gas or solid state, and after the sample is turned into a droplet by chemical reaction or the like, the droplet is recovered.

Further, means for confining the supplied sample in the floating space without any ambient contact may include another means using, for example, a sound wave, electromagnetic repulsion in addition to the opposed electrodes 2a, 2b described in the above embodiments 18 to 21.

As stated above, according to the first aspect of the present invention, the droplet floating apparatus includes the liquid sample supply pipe whose distal end is opened to the floating space, to receive supply of the liquid sample to form the droplet at the distal end, the separating means for separating the droplet from the liquid sample supply pipe, and the means for confining the separated droplet in the floating space without ambient contact. In the droplet floating apparatus, since the separating means uses the gas, it is possible to easily separate the droplet, and stably supply the droplet into the floating space.

According to the second aspect of the present invention, the separating means using the gas according to the first aspect is the means for spraying the pressurized gas on the droplet. Spray pressure of the gas exceeds the adsorptivity between the liquid sample supply pipe and the droplet, thereby separating the droplet formed at the distal end of the liquid sample supply pipe from the liquid sample supply pipe. As a result, it is possible to stably supply the droplet into the floating space.

According to the third aspect of the present invention, the droplet floating apparatus according to the second aspect includes the multi-tube whose distal end is opened to the floating space. Further, the liquid sample is supplied through at least the one tube, and the gas is supplied through at least the one remaining tube. As a result, it is possible to efficiently separate the droplet in a compact and simple structure.

According to the fourth aspect of the present invention, the distal end of the multi-tube according to the third aspect has the step between the inner tube and the outer tube. As a result, it is possible to avoid entrance of the liquid into the gas supply pipe.

According to the fifth aspect of the present invention, the droplet floating apparatus according to the third or the fourth aspect includes the means for removing the liquid entering the gas supply pipe. As a result, it is possible to remove the liquid entering the gas supply pipe and stably separate the droplet.

According to the sixth aspect of the present invention, in the droplet floating apparatus according to the fifth aspect, the liquid entering the gas supply pipe is removed by ejection or suction of the gas. As a result, it is possible to easily remove the liquid.

According to the seventh aspect of the present invention, the means for spraying the pressurized gas on the droplet according to the second aspect is the pipe formed separately from the liquid sample supply pipe to have the gas port in the vicinity of the distal end of the liquid sample supply pipe. As a result, the liquid never enters the gas supply pipe. Further, the gas can be ejected to the droplet from all the directions as well as from the lower direction. As a result, it is possible to more stably and easily separate the droplet.

According to the eighth aspect of the present invention, the pressurized gas supply means according to the second aspect is the cylinder or the high pressure bomb. As a result, it is possible to easily supply the high pressure gas.

According to the ninth aspect of the present invention, in the droplet floating apparatus according to the first aspect, the liquid sample and the gas are alternately fed into the liquid sample supply pipe. As a result, it is possible to separate the droplet from the pipe in a simple structure, for example, in a structure without the cylinder.

According to the tenth aspect of the present invention, the droplet is separated from the liquid sample supply pipe by applying the voltage between the liquid sample supply pipe and the electrode opposed thereto. As a result, it is possible to separate the droplet from the liquid sample supply pipe in a simple structure, for example, in a structure without the cylinder. Further, it is possible to stably supply the droplet by adjusting the voltage.

According to the eleventh aspect of the present invention, in the droplet floating apparatus according to the tenth aspect, the means for confining the droplet has at least the pair of opposite electrodes, and the droplet is separated from the liquid sample supply pipe by applying the pulse voltage between the one electrode and the liquid sample supply pipe. Therefore, an additional electrode for separation is not required, resulting in a simplified structure.

According to the twelfth aspect of the present invention, the droplet is separated from the liquid sample supply pipe by periodically vibrating the liquid sample supply pipe. As a result, it is possible to easily separate the droplet, and stably supply the droplet into the floating space.

According to the thirteenth aspect of the present invention, in the droplet floating apparatus according to the twelfth aspect, the liquid sample supply pipe is periodically vibrated by rotating the weight eccentrically and rotatably attached to the liquid sample supply pipe through the shaft. As a result, it is possible to provide the optimal period and the optimal amplitude by selecting a type of the weight and the number of revolutions thereof.

According to the fourteenth aspect of the present invention, in the droplet floating apparatus according to the twelfth aspect, the liquid sample supply pipe is periodically vibrated by rotating the rotator having the projection, and contacting the projection with the liquid sample supply pipe. As a result, it is possible to provide the optimal period and the optimal amplitude by selecting a type of the rotator and the number of revolutions thereof.

According to the fifteenth aspect of the present invention, in the droplet floating apparatus according to the twelfth aspect, the liquid sample supply pipe is disposed in contact with the ultrasonic vibrator, and the liquid sample supply pipe is periodically vibrated by the ultrasonic vibrator. As a result, it is possible to provide the optimal period and the optimal amplitude.

According to the sixteenth aspect of the present invention, in the droplet floating apparatus according to the twelfth aspect, the magnetic material is rigidly secured to the liquid sample supply pipe, and the magnetic material is vibrated by causing the ac current flow or the pulse current flow in the coil so as to periodically vibrate the liquid sample supply pipe. As a result, it is possible to provide the optimal period and the optimal amplitude.

According to the seventeenth aspect of the present invention, the distal end of the liquid sample supply pipe is cut away diagonally with respect to the axis of the liquid sample supply pipe. As a result, it is possible to reduce the adsorptivity between the droplet and the liquid sample supply pipe so as to easily separate the droplet.

According to the eighteenth aspect of the present invention, the droplet is separated from the liquid sample supply pipe by heating the distal end of the liquid sample supply pipe. As a result, it is possible to easily separate the droplet, and stably supply the droplet into the floating space.

According to the nineteenth aspect of the present invention, the heating wire or the infrared ray is used to heat the distal end of the liquid sample supply pipe according to the eighteenth aspect. As a result, it is possible to easily control the amount of heating.

According to the twentieth aspect of the present invention, the droplet floating apparatus includes the plurality of liquid sample supply pipes. As a result, it is possible to simultaneously supply the plurality of types of liquid samples.

According to the twenty-first aspect of the present invention, in the droplet floating apparatus according to the twentieth aspect, the respective distal ends of the plurality of liquid sample supply pipes are disposed in close proximity to each other, and the liquid samples fed into the respective liquid sample supply pipes are mixed at the distal ends to be separated from the liquid sample supply pipes. As a result, it is possible to mix the plurality of types of liquid samples before the separation from the liquid sample supply pipes.

According to the twenty-second aspect of the present invention, in the droplet floating apparatus according to the twentieth aspect, the respective distal ends of the plurality of liquid sample supply pipes are disposed apart from each other at predetermined intervals. Further, the droplets are formed at the respective distal ends by supplying the liquid samples into the respective liquid sample supply pipes, and are separated from the respective liquid sample supply pipes. As a result, it is possible to mix the plurality of types of liquid samples after the separation from the liquid sample supply pipe.

According to the twenty-third aspect of the present invention, the droplet floating apparatus includes the means for recovering the droplet confined in the floating space without ambient contact. As a result, it is possible to recover the droplet.

According to the twenty-fourth aspect of the present invention, in the droplet floating apparatus according to the twenty-third aspect, the droplet is sucked for recovery by the droplet recovery pipe. As a result, it is possible to easily recover the droplet.

According to the twenty-fifth aspect of the present invention, the droplet floating apparatus according to the twenty-fourth aspect includes the liquid sample supply pipe whose distal end is opened to the floating space, to receive supply of the liquid sample to form the droplet at the distal end. Further, the liquid sample supply pipe also serves as the droplet recovery pipe. As a result, it is possible to simplify a structure.

According to the twenty-sixth aspect of the present invention, in the droplet floating apparatus according to the twenty-third aspect, the adsorber is inserted into the floating space to adsorb the droplet for recovery. As a result, it is possible to easily recover the droplet.

According to the twenty-seventh aspect of the present invention, the adsorber according to the twenty-sixth aspect is the needle-like or sheet-like adsorber. As a result, it is possible to easily recover the droplet.

While preferred embodiments of the invention have been described using specific terms, such description is for illustrative purposes only, and it is to be understood that changes and variations may be made without departing from the spirit or scope of the following claims.

What is claimed is:

1. A droplet floating apparatus, comprising:

a liquid sample supply pipe having a first end opened to a floating space, and a second end to receive supply of a liquid sample to form a droplet at the first end;

separating means for separating the droplet from the first end of the liquid sample supply pipe; and means for confining the separated droplet within the floating space after the separating means separates the droplet from the first end of the liquid sample supply pipe;

wherein the separating means includes means for vibrating the liquid sample supply pipe such that the droplet is stably supplied into the floating space without splashing the droplet, wherein the means for vibrating includes:

a motor secured to a side of the liquid sample supply pipe, the motor having a shaft; and a weight connected to the shaft of the motor such that the weight is rotatably attached to the liquid sample supply pipe, wherein the liquid sample supply pipe is periodically vibrated by rotating the weight eccentrically to prevent the droplet from splashing when the droplet is separated from the liquid sample supply pipe.

2. A droplet floating apparatus, comprising:

a liquid sample supply pipe having a first end opened to a floating space, and a second end to receive supply of a liquid sample to form a droplet at the first end;

separating means for separating the droplet from the first end of the liquid sample supply pipe; and means for confining the separated droplet within the floating space after the separating means separates the droplet from the first end of the liquid sample supply pipe;

wherein the separating means includes means for vibrating the liquid sample supply pipe such that the droplet is stably supplied into the floating space without splashing the droplet, wherein the means for vibrating includes:

a projecting member connected to a side of the liquid sample supply pipe; and a rotator having a plurality of projections that periodically contact the projecting member when the rotator rotates such that the liquid sample supply pipe is periodically vibrated by the rotator to prevent the droplet from splashing when the droplet is separated from the liquid sample supply pipe.

* * * * *